United States Patent [19]

Olich

[11] Patent Number: 5,298,904
[45] Date of Patent: Mar. 29, 1994

[54] DISTANCE MEASURING SYSTEM

[76] Inventor: Kirk J. Olich, 6209 E. McKellips #424, Mesa, Ariz. 85205

[21] Appl. No.: 924,641

[22] Filed: Aug. 4, 1992

[51] Int. Cl.$^5$ .............................................. G01S 13/74
[52] U.S. Cl. ..................................... 342/42; 342/103; 342/125; 342/127
[58] Field of Search ................... 342/42, 125, 127, 103

[56] References Cited

U.S. PATENT DOCUMENTS

| | | | |
|---|---|---|---|
| 3,213,449 | 10/1965 | Kobayashi et al. | 342/125 |
| 3,725,920 | 4/1973 | Küpfer et al. | 342/125 |
| 4,297,701 | 10/1981 | Henriques | 342/42 |
| 4,703,444 | 10/1987 | Storms, Jr. et al. | 342/451 X |
| 5,056,106 | 10/1991 | Wang et al. | 342/451 X |

Primary Examiner—T. H. Tubbesing
Attorney, Agent, or Firm—Joseph H. Roediger

[57] ABSTRACT

A distance measuring system which may be used on a golf course in order for a golfer to accurately measure the distance between the present lie of his golf ball and the hole toward which he is currently advancing the golf ball. A master transceiver station is portably carried by the golfer to be disposed proximate the lie of his ball for measurement purposes, and a remote transceiver system is located in or on each hole's flag marker pole. The present system uses, as the basic measurement frequency, only the frequency of the remote carrier itself. Two separate and distinct phase measurements are made in rapid succession. The first measurement is made with the master RF carrier displaced above the remote carrier frequency by amount equal to the IF frequency, and the second measurement is made with the master carrier frequency displaced below the remote carrier frequency by the same amount. With these two phase measurements, range or distance can be measured unambiguously and accurately over a required distance of at least 300 yards for golf purposes. The phase information from the remote location is communicated to the master location by phase-locking the carriers together. This avoids the necessity of using modulated subcarriers to transmit this information. This, in turn, reduces the occupied bandwidth, simplifies the modulation-demodulation required, and reduces errors normally introduced by the subcarrier filtering processes of the prior art.

22 Claims, 9 Drawing Sheets

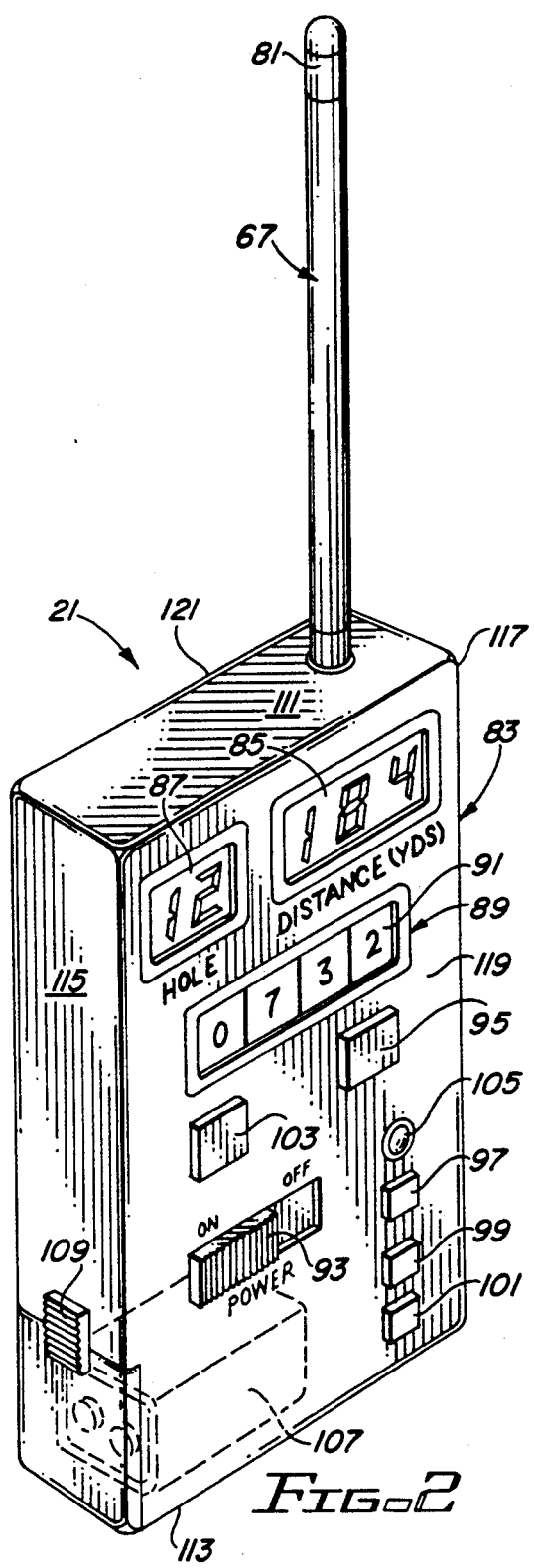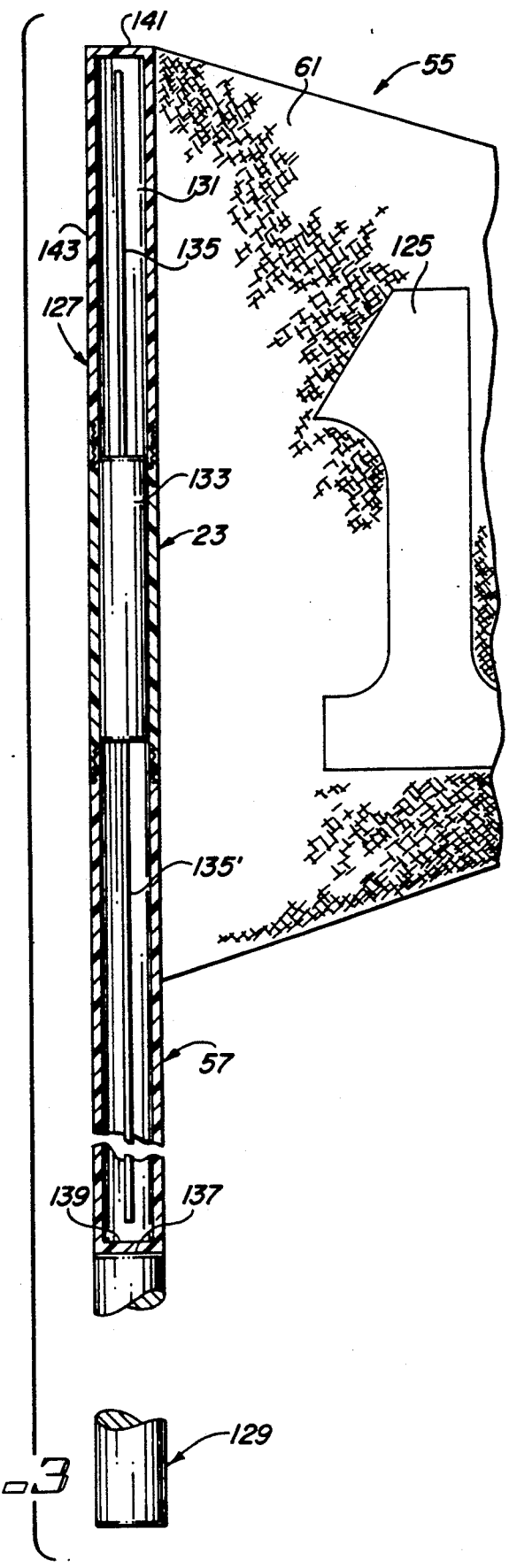

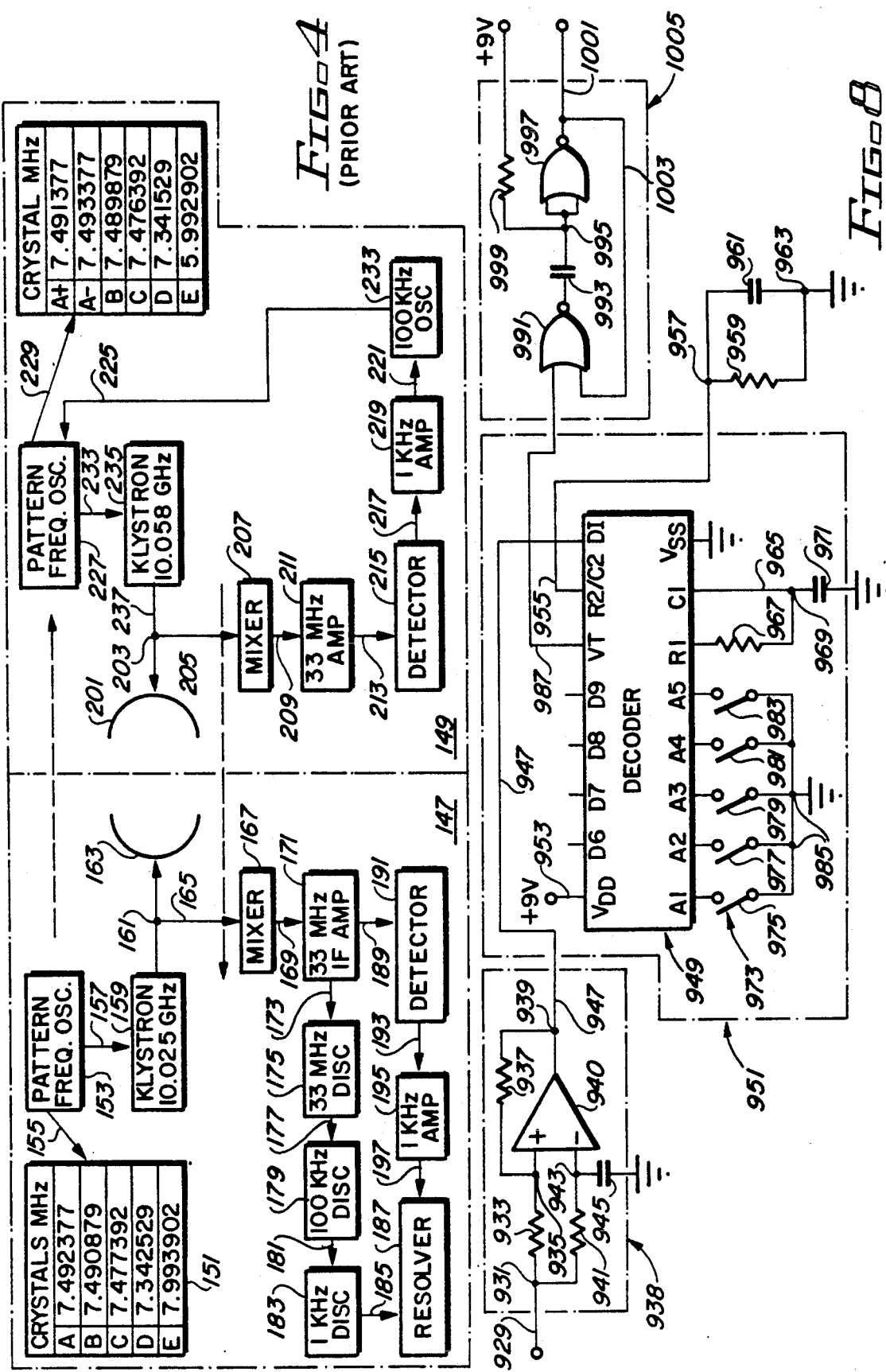

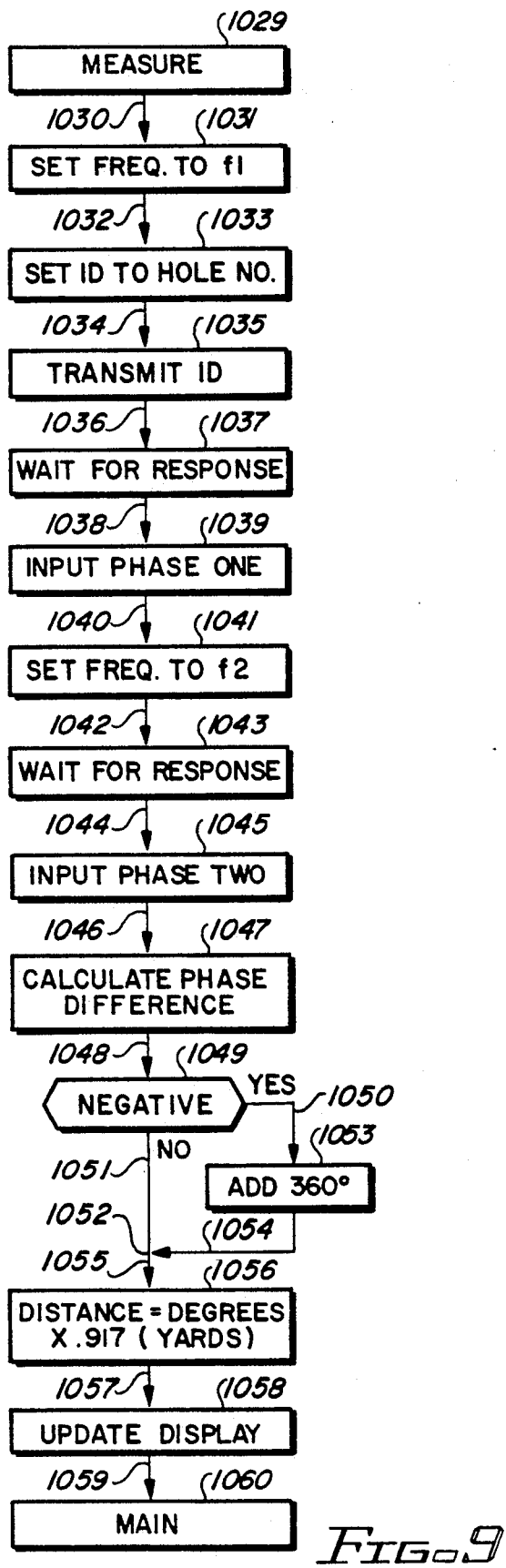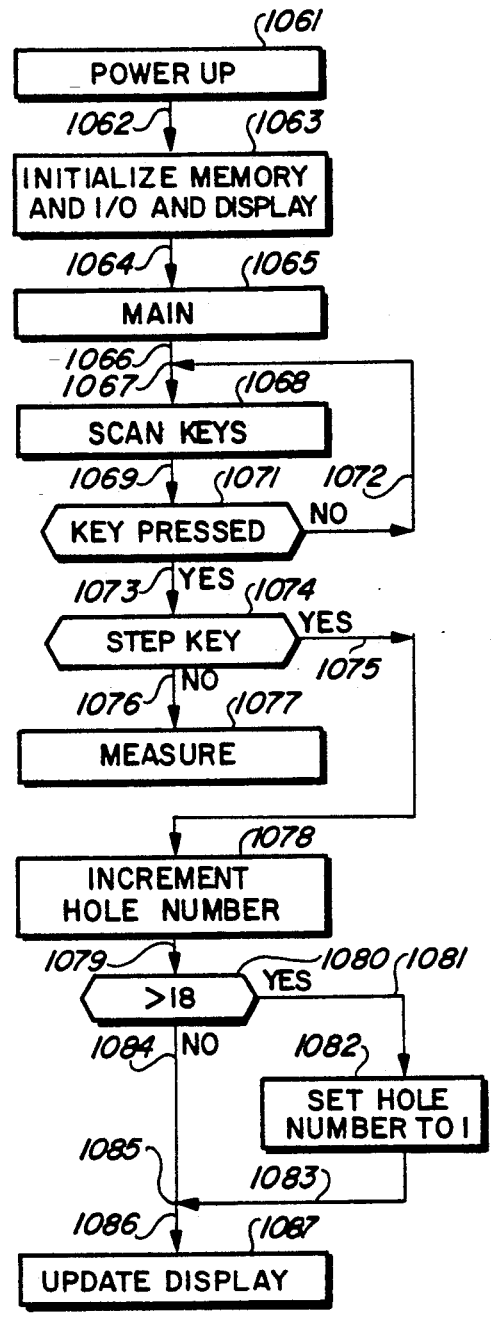
FIG. 9
FIG. 10

DISTANCE MEASURING SYSTEM

BACKGROUND OF THE INVENTION

1. Field Of The Invention

This invention relates generally to a distance measuring system, and more particularly, to a distance measuring system for use on a golf course for enabling a golfer to accurately determine the distance between the current lie of his golf ball and the hole toward which he is presently advancing his golf ball.

2. Description Of The Prior Art

The prior art discloses various, relatively complex and expensive systems and methods for measuring distance. One such system is the Tellurometer system described briefly herein with respect to FIG. 4.

The Tellurometer system uses microwaves at about 3, 10, or 35 GHz as the carrier frequency. The measuring set consists of two active units with a transmitter and a receiver, one being called the master and the other being called the remote unit. The carrier frequencies of the two units differ slightly, making it possible to utilize intermediate frequency (IF) amplification. The microwave carriers are frequency modulated by measurement or pattern signals that are slightly different at the master and remote units, to create beat frequencies in those units. Also, several other nearby pattern frequencies build up the total unambiguous distance. The range of the modulation frequency varies according to the model between five and twenty-five MHz. Because the carriers are microwaves, the beamwidths are relatively narrow, usually between two degrees and twenty degrees. Measuring can be carried on either at night or daytime, through haze or light rain, although heavy rainfall may reduce the working range.

The bare outlines of the measurement principal are as follows: a frequency-modulated carrier wave from the master station is sent to the remote station, where it is received and retransmitted to the master station. There, the phase difference between the transmitted and the received modulation or pattern wave is compared. The distance can be determined by knowing the average velocity of the radio waves along the wave path and also the master modulation wavelength. The development of the Tellurometer system of measurements was initiated by W. Wadley in 1957 at The National Institute of Telecommunications Research of South Africa and is now the basis of all microwave distance measuring instruments.

None of the systems of the prior art relate in any way to measuring the distance between the lie of a golfer's ball and the hole toward which the golfer is presently advancing his golf ball.

All known distance measurement systems of the prior art are relatively complex, expensive, difficult to install and maintain, subject to many types of measurement errors, often occupy excessive bandwidths, are susceptible to noise interference, produce errors in the subcarrier filtering process, and/or require complex modulation/demodulation operations which can result in even more errors.

The present invention avoids all of these problems, while fulfilling a long-felt, and previously unfilled, need for a relatively simple, low-cost, easy-to-install and maintain system which uses a portable master transceiver station and at least one remote transceiver station.

The present system is far simpler than the Tellurometer system in at least two very significant ways. In the first place, the basic measurement frequency is the remote RF carrier frequency itself, for example, 318 MHz. Two separate and distinct phase measurements are made in rapid succession. One measurement is made with the master RF carrier displaced above the remote carrier frequency by an amount equal to the IF frequency, or approximately 248 KHz. The second measurement is made with the master carrier frequency displaced below the remote carrier frequency by the same amount. With these two phase measurements, range can be determined unambiguously over the required distance of at least three hundred yards, at least for golfing purposes.

Secondly, the phase information from the remote location is communicated to the master location by phase-locking the carriers together. This avoids the necessity of using modulated subcarriers to transmit this information. This, in turn, reduces the occupied bandwidth, greatly simplifies the modulation-demodulation required, and very substantially reduces errors otherwise introduced by the subcarrier filtering processes.

BRIEF SUMMARY OF THE INVENTION

It is an object of the present invention to provide an improved distance measuring system;

It is another object of this invention to provide an improved method for measuring the distance between a point "A" and a point "B";

It is a further object of this invention to provide an improved distance measuring system and method for use on golf courses for enabling a golfer to accurately, quickly and easily measure the distance between the current lie of his golf ball and the particular hole toward which he is presently advancing his golf ball for club selection purposes and the like;

It is still another object of the present invention to provide a method for measuring distance which can be used on a golf course for enabling a golfer to accurately, quickly and easily measure the distance between the current lie of his golf ball and the particular hole toward which he is presently advancing his golf ball;

It is yet another object of the present invention to provide a distance measuring system wherein the basic measurement frequency is the frequency of the remote carrier itself;

It is still a further object of this invention to provide a distance measuring system in which the phase information from the remote location is communicated to the master location by phase-locking the two carriers together;

It is yet a further object of this invention to provide a distance measuring system which has the advantages of reducing the occupied bandwidth, simplifying the modulation-demodulation required, and greatly reducing errors introduced by the subcarrier filtering processes normally required by prior art techniques;

It is another object of the present invention to provide a distance measuring system and method thereof which utilizes a first and second phase measurement to resolve ambiguities due to the repetition of the waveform every one-half wavelength;

It is still another object of this invention to provide a method and apparatus for measuring distance from the lie of a golfer's ball to the hole presently being approached by the golfer on the golf course;

It is yet another object of the present invention to provide a method and apparatus for measuring distance on a golf course which includes means for positively identifying the particular remote transmitter system as the remote transmitter system associated with the particular hole toward which the golfer is presently advancing his golf ball;

It is yet a further object of this invention to provide a remote transceiver system with a means for encoding its unique hole identification number, and a master transceiver system which generates a data signal indicative of the identification of the particular hole toward which the golfer is presently advancing his golf ball and transmits the data signal to the remote transceiver system by modulating the master carrier frequency signal therewith;

It is another object of this invention to provide a housing for the master transceiver system which includes a display panel for visually displaying the measured distance, a display means for visually indicating the number of the hole currently being approached, and a clock for selectively displaying at least one of the time of day, a "lost ball" time, the elapsed time per hole, and/or the elapsed time for the game, as well as manually-operable control means for controlling same;

The present invention relates to a method and apparatus or system for measuring the distance between a point "A" and a remote point "B", and more particularly, to such a method and apparatus or system for accurately, quickly and easily measuring the distance between a point "A" and a remote point "B".

In the present apparatus and method, the basic measurement frequency is the remote RF carrier frequency itself. Two phase measurements are made in rapid succession. One phase measurement is made with the master RF carrier being displaced above the remote carrier frequency by amount equal to the IF frequency, and the other phase measurement is made with the master carrier frequency being displaced below the remote carrier frequency by the same amount. With these two phase measurements, range can be determined unambiguously over a required distance of at least 300 yards, at least for golfing purposes or the like.

The phase information from the remote location is communicated to the master location by phase-locking the two carriers together. This avoids the necessity of using modulated subcarriers to transmit this information. This, in turn, reduces the occupied bandwidth, greatly simplifies the modulation-demodulation required, and substantially reduces errors introduced by the usual subcarrier frequency filtering processes of the prior art.

In the absence of a received signal, the out-of-lock detector at the remote transceiver station switches the sense or polarity of the loop filter output periodically. When a signal is received from the master transceiver station, the phase-lock loop will lock up when the switch is in the proper state. The sense switch will then stay in that state as long as the loop stays locked, i.e., as long as the master carrier frequency signal is being received. A frequency synthesizer at the master transceiver station is first programmed at a particular master carrier frequency signal and this signal is transmitted to the remote transceiver station.

At the remote transceiver station, the first master carrier frequency signal is mixed with the remote carrier frequency signal from the remote UHF oscillator to produce a first remote difference frequency. This first difference frequency is amplified by the remote IF amplifier and applied to one input of a remote phase comparator. The other input of a phase comparator is a divided-down remote carrier frequency signal.

When the phase-lock loop becomes locked, the phase of the IF frequency will equal the difference in phase between the remote carrier frequency signal and the received master carrier frequency signal. This establishes a first known phase reference for the remote position, and the remote carrier frequency signal is transmitted back to the master position with this first known phase reference.

At the master transceiver station, the remote carrier frequency signal is mixed with the first master carrier frequency signal to obtain a first frequency difference signal which is amplified by the master IF amplifier and applied to one input of a master phase detector. The other input of the phase detector is connected to the divided-down master reference signal, and the master phase detector output represents the distance between the master and remote locations. However, the result is ambiguous because it repeats every one-half wavelength of the first master carrier frequency signal.

The master transceiver system's frequency synthesizer is then programmed for generating a second different and distinct master carrier frequency signal and the process is repeated. The resulting output from the master phase detector is combined with the previous result and the difference represents, as a fraction of one-half the wavelength of the second master carrier frequency signal, or 327 yards, a relatively accurate and unambiguous measurement of the distance required of at least 300 yards, at least for golfing purposes.

These and other objects and advantages of the present invention will be more fully understood after reading the Detailed Description of the Preferred Embodiments, the Claims, and the Drawings, which are briefly described hereinbelow.

BRIEF DESCRIPTION OF THE DRAWINGS

FIG. 2 is a perspective view of the master transceiver system of the present invention as enclosed within a housing unit;

FIG. 3 is a sectional side view of at least the upper end portion of a flag marker pole having the remote transceiver station operatively disposed within the hollow interior thereof;

FIG. 4 is a schematic block diagram of the Tellurometer system of the prior art;

FIG. 8 is a schematic diagram of the hole identification or verification system of the remote transceiver system of the present invention;

FIG. 9 is a flow diagram of the operation of the present invention for distance measuring purposes; and FIG. 10 is another flow diagram showing the operation of the present invention for updating the displays and the like.

DETAILED DESCRIPTION OF THE PREFERRED EMBODIMENTS

Figure 1:
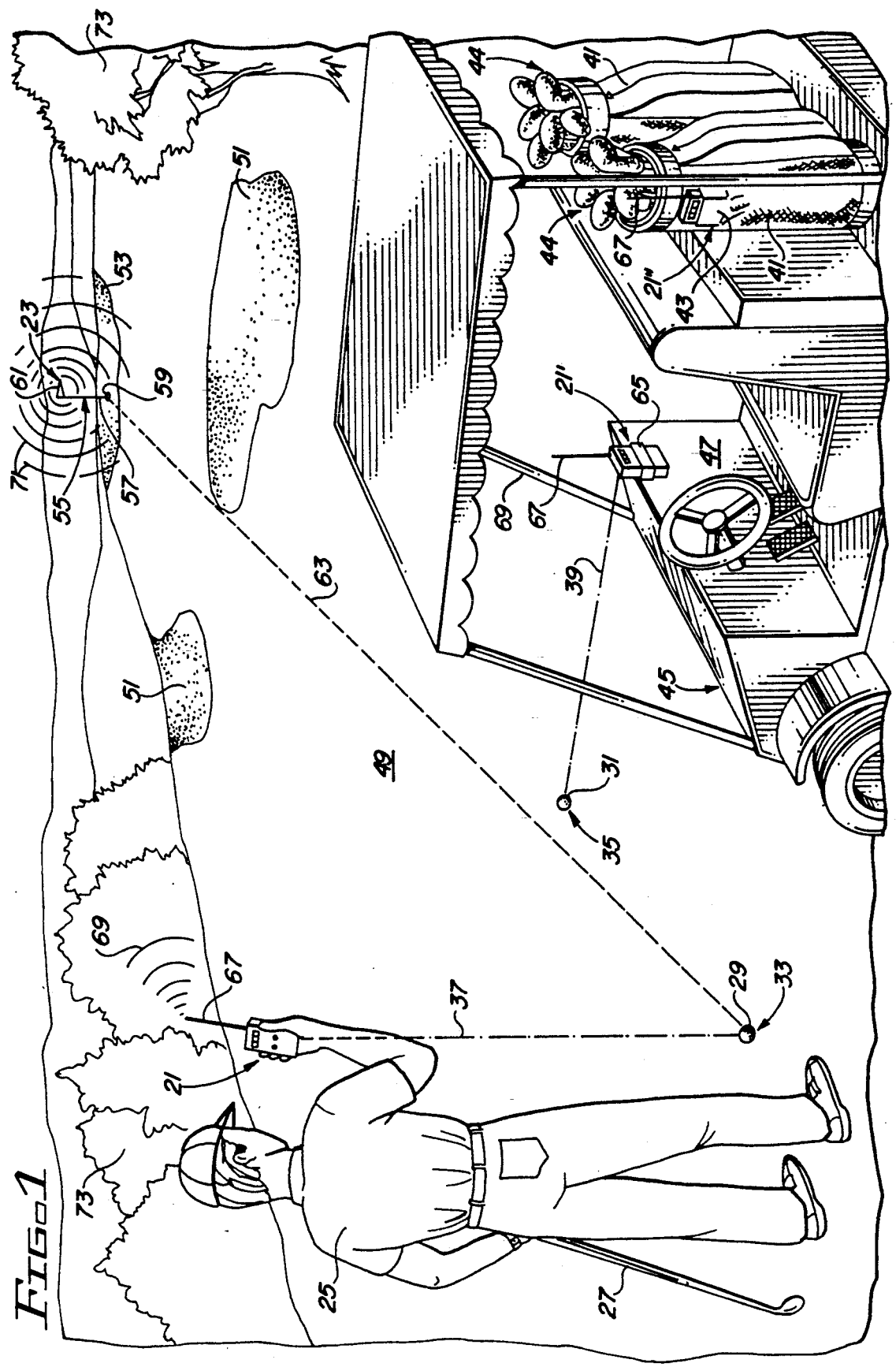
FIG. 1 is a perspective view of a golfer utilizing the method and apparatus or system of the present invention.

FIG. 1 shows a master transceiver system, subsystem, unit or station 21 and a remote transceiver station, unit, subsystem or system 23. A golfer 25, shown as having a golf club 27 and first golf ball 29, is utilizing the present invention to measure the distance from the current lie 33 of his golf ball 29 to the hole 59.

A second golf ball 31 is also shown abeam, adjacent, or proximate a second master transceiver system 21', while a third master transceiver station 21" is operably disposed in the pocket 43 of a golf bag 41. The lie of the first golf ball 29 is shown by the arrow 33, and the lie of the second golf ball 31 is shown by the arrow 35. The golfer 25 is shown as standing directly vertically over or above the golf ball 29, as indicated by the dashed line 37, while the golf cart 45 is shown as positioning the second master transceiver station 21' abeam, adjacent, or proximate the ball 31 as indicated by the dashed line 39. A golf bag 41 with golf clubs 44 is shown in the rear of the golf cart 45 as having a side pocket 43 which is used to portably contain a third master transceiver system 21". It can, therefore, be seen that the master transceiver system 21 of the present invention is portable and can be carried on the golfer's person, by attachment to his belt, or the like, fixedly or removeably secured to the front dashboard 47 of the golf cart 45 via bracket 65, or the like, or within the pocket 43 of the golf bag 41 and so on.

The golf course is shown as having fairway 49 lined with trees 73, a plurality of sand traps 51, a green or putting surface 53, and a flag marker 55 comprising a flag marker pole 57 which is used to uniquely identify the hole 59. The flag marker pole 57 has, at its upper end portion, a flag 61 which bears indicia means, not shown in FIG. 1, but well-known in the art, which uniquely identifies the particular number of that hole in the sequence of holes on the golf course. The dashed line 63 represents the distance to be measured from the lie 33 of the first golf ball 29 to the hole 59. The second master transceiver 21' is shown as being attached to the dashboard 47 of a golf cart 45 via a bracket 65. Each of the master transceivers 21, 21' and 21", are shown as including an antenna 67. The waves 69 represent the transmission of radio signals from the master transceiver 21 to the remote transceiver 23 while the waveforms 71 represent either the reception and/or transmission to and from the remote transceiver 23.

FIG. 2 shows the master transceiver 21 of the present invention as enclosed within a housing 83 having an antenna 67 with a raisable or retractable upper end portion 81. The housing 83 is generally rectangular and includes a top 111, bottom 113, left side 115, right side 117, front face 119, and a rear surface or back panel 121. The transceiver 21 also shows its housing 83 as including, on the front face 119 thereof, a distance display panel 85, a hole identification display panel 87, a time display panel 89 for providing a time readout 91, a power on-off switch 93, a measurement request switch 95, a time set switch 97, an elapsed time start switch 99, a "lost ball" timer switch, if desired, a time of day switch 101, and a hole stepping switch 103 for stepping to the next hole to be addressed by the golfer once he has putted his ball into the present hole. The front panel 119 also includes an indicator light 105 while a battery 107 is shown as being housed within a hollow interior of the housing 83 which is provided with a battery access latch 109 on the left hand side 115. It will be understood that the time display panel 89 can be any type of digital clock/timer available in the prior art with its associated time of day or elapsed time switches.

FIG. 3 illustrates the flag marker assembly 55 as including an elongated marker pole of flag pole or mast 57, an upper end portion 127 and a lower end portion 129. In FIG. 3, the pole 57 is shown as having a hollow interior 131 in which the remote transceiver 23 is operably disposed within a remote transceiver housing 133 having antennas 135 and/or 135' extending therefrom. The lower end portion 129 of the pole 57 includes a solid portion 137, and the pole 57 has a closed lower end portion 139. The hollow interior 131 is surrounded by cylindrical walls 143, and the upper end portion 127 of the flag marker pole 57 is closed by cap 141 and carries a flag 55 which has indicated thereon, indicia means 125 for positively and uniquely identifying the unique hole number of the particular hole in which the bottom or lower end portion 129 of the pole 57 is disposed for supporting the pole 57 in a generally vertically upright manner.

FIG. 4 illustrates the Tellurometric distance measuring system of the prior art. In FIG. 4, a master station 147 is shown on the left side of the page, while a remote station 149 is shown on the right hand portion of the page. In the master station 147, block 151 represents the crystal frequencies most often used in such systems. The crystal reference frequency used is supplied to a pattern frequency oscillator 153, as indicated by arrow 155 and the output of the pattern frequency oscillator 153 is connected via path 157 to a klystron unit 159 which in the present embodiment, operates on 10.025 GHz. The output of the klystron 159 is supplied to output node 161. Node 161 supplies the signal to the microwave transmission antenna 163 and, via path 165, to a mixer 167. The output of the mixer is taken via lead 169 and supplied to a 33 MHz IF amplifier 171. One output of the IF amplifier 171 is taken via lead 173 to the input of a 33 MHz discriminator 175. The output of the discriminator 175 is taken via lead 177 to the input of a 100 KHz discriminator 179. Similarly, the output of the discriminator 179 is taken via lead 181 and supplied to the input of a 1 KHz discriminator 183 whose output is taken via lead 185 to serve as one input of a resolver 187.

The second output of the 33 MHz IF amplifier 171 is connected via lead 189 to the input of a detector 191. The output of detector 191 is connected via lead 193 and supplied to the input of a 1 KHz amplifier 195. The output of the amplifier 195 is connected via lead 197 to the second input of the resolver 187.

The remote station 149 includes a microwave antenna 201 whose input/output is connected to node 203. Node 203 is connected via lead 205 to the input of a mixer 207 whose output is connected via lead 209 to the input of a 33 MHz amplifier 211. The output of the amplifier 211 is connected via lead 213 to the input of a detector circuit 215, and the output of detector circuit 215 is connected via lead 217 to the input of a 1 KHz amplifier 219. The output of amplifier 219 is connected via lead 221 to the input of a 100 KHz oscillator 223 whose output is connected via lead 225 to one input of a pattern frequency oscillator 227. The arrow 229 points to a second box 231 which contains a plurality of crystal frequencies usable with the remote station of the present system invention. The output of the pattern frequency oscillator 227 is connected via lead 233 to the input of a klystron 235 which generally operates at 10.058 GHz.

The output of the klystron 235 is taken from lead 237 and supplied to the output node 203, and thence to antenna 201 for transmission to the master station 147, as previously described.

The Tellurometer of FIG. 4 uses microwaves at about 3, 10, or 35 GHz as the carrier frequency. The measuring set consists of two active units with a transmitter and a receiver; one being referred to as the master station 147 and the other as the remote station 149. The two carrier frequencies of the two units differ slightly, making it possible to utilize intermediate frequency (IF) amplification. The microwave carriers are frequency modulated by measurement or pattern signals that are slightly different at the master and remote units, to create beat frequencies in those units. Also, several other nearby pattern frequencies build up the total unambiguous distance measurement. The range of the modulation frequencies varies according to the model, between 5 and 25 MHz.

Because the carriers are microwaves, the beam widths are relatively narrow, normally between 2 degrees and 20 degrees. The measuring can be carried out either at night or daytime, through haze or light rain, although heavy rainfall may reduce the working range and accuracy.

The bare outlines of the measuring principal are as follows: a frequency-modulated carrier wave from the master station is sent to the remote station, where it is received and retransmitted to the master station. There, the phase difference between the transmitted and received modulation or pattern waves is compared. The distance can be determined by knowing the average velocity of the radio waves along the wave path and also the master modulation wavelength.

Figure 5:
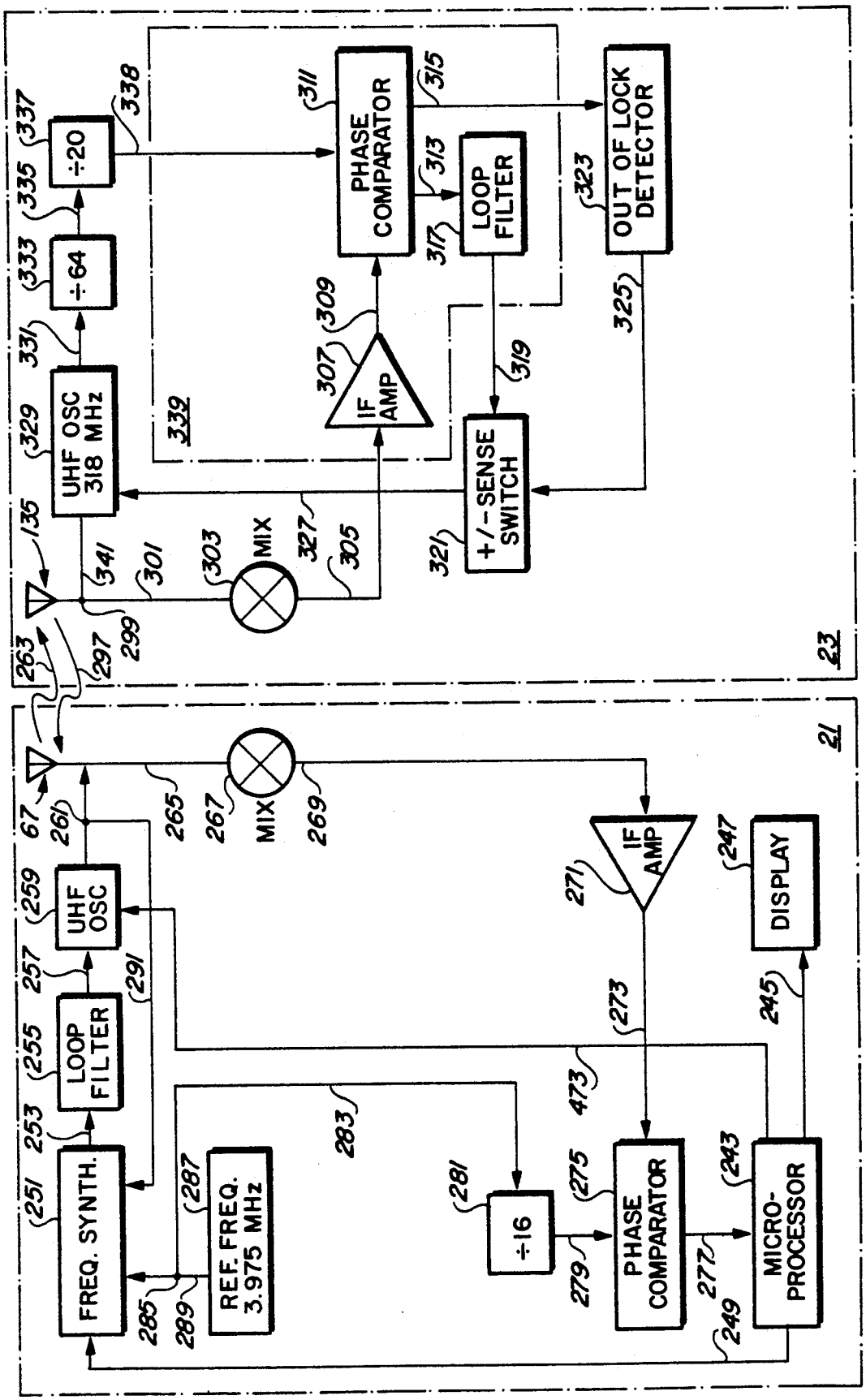
FIG. 5 is a block diagram of the distance measuring system of the present invention.

FIG. 5 illustrates, in block diagram form, the distance measurement system of the present invention. In FIG. 5, the system is shown as including a master transceiver system, subsystem, station, unit, or the like 21 and a remote transceiver station, system, subsystem, unit, or the like 23.

Figure 6A:
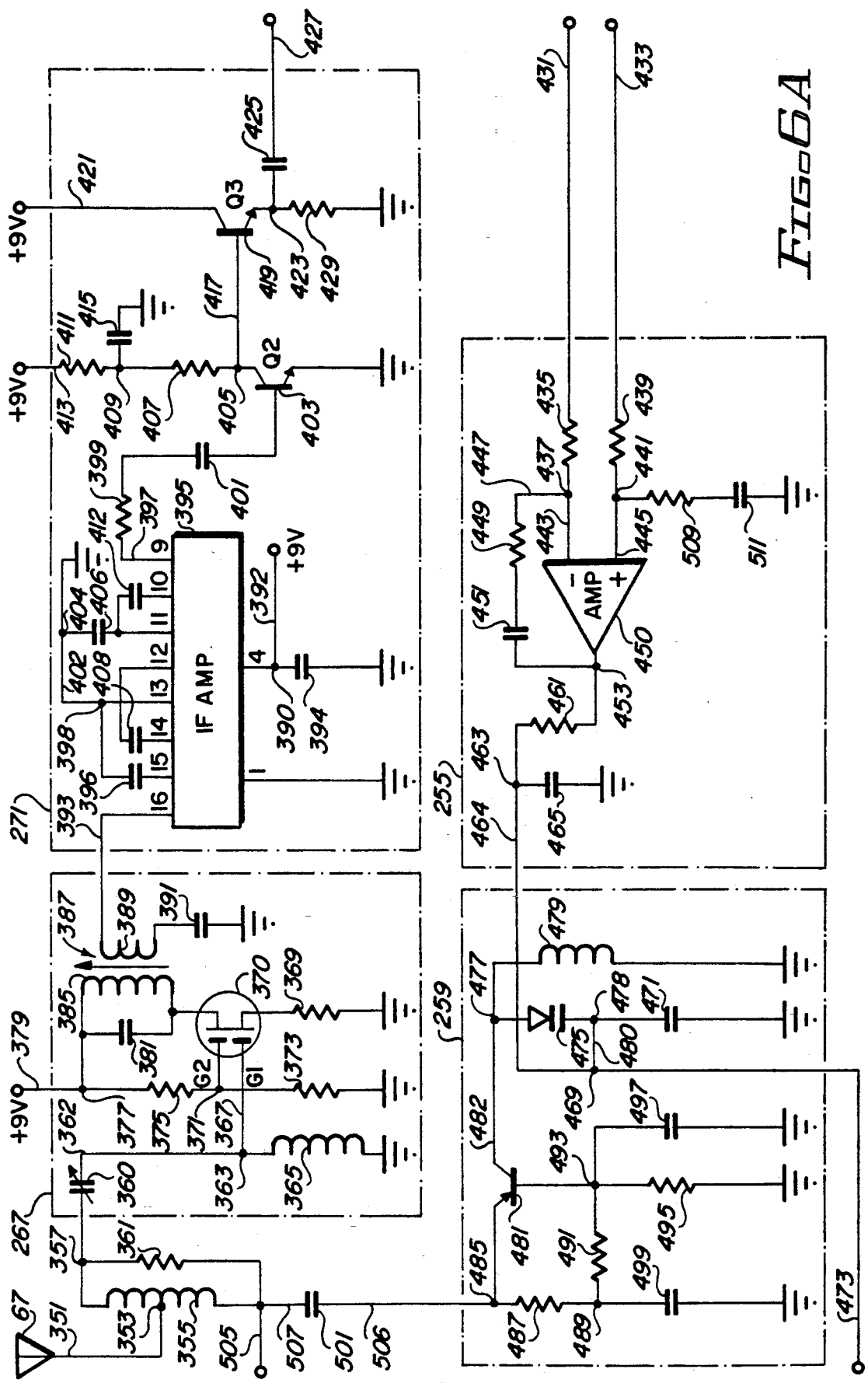
FIGS. 6A and 6B are electrical schematic diagrams of the master transceiver system portion of the block diagram of FIG. 5.

The master transceiver system 21 is shown as including a microprocessor 243. The microprocessor 243 has a first microprocessor output 245 which is connected directly by lead 245 to the panel displays 247. A second microprocessor output is taken via lead 249 and supplied to one input of a frequency synthesizer 251. A third output which provides the coding signal to modulate the carrier as shown in FIG. 6A is coupled via lead 473 to oscillator 259. The output of the frequency synthesizer 251 is taken via lead 253 and supplied to the input of a loop filter 255. The output of the loop filter 255 is taken via lead 257 and fed to the input of a UHF oscillator 259 whose output is connected directly to a node 261. Node 261 is connected directly to the master antenna 67 and, via feedback path 291, to a second input of the frequency synthesizer 251.

The antenna 67, in addition to being coupled directly to the output node 261, is connected via lead 265 to the input of a mixer 267 whose output is taken via lead 269 and supplied to the input of an IF amplifier 271. The output of the IF amplifier 271 is supplied via lead 273 to one input of a phase detector 275 whose output is taken via lead 277 and supplied back to one input of the microprocessor 243. The other input of the phase comparator 275 is taken from the output of a divide-by-16 counter circuit 281. The input to the counter circuit 281 is supplied via lead 283 from a node 285. Node 285 is connected to the output of a reference frequency generator circuit 287, via lead 289, and, in the preferred embodiment hereof, the reference frequency generator circuit 287 generates a master reference frequency signal at 3.975 MHz. Node 285 is also connected to the second input of the frequency synthesizer 251. The operation of the system of the master transceiver 21 will be described hereinafter.

The radio signals transmitted from the master antenna 67 are shown as radio waves 263 going to the remote antenna 135, while the remote antenna signals are shown as radio waves 297 being transmitted to the master antenna 67. The remote antenna 135 is connected to an input/output node 299. Node 299 is connected via lead 301 to the input of a mixer circuit 303. The output of the mixer 303 is taken via lead 305 and connected to the input of a IF amplifier 307 whose output is connected via lead 309 to one input of a phase comparator 311. One output of the phase comparator 311 is connected via lead 313 directly to the input of a loop filter 317, and the output of the loop filter 317 is connected via lead 319 to one input of a plus or minus sense or polarity switching circuit 321.

The second output of the phase comparator 311 is taken via lead 315 and supplied to the input of an out-of-lock detector circuit 323 whose output is taken via lead 325 and supplied to the second input of the sense switch 321. The output of the sense switch 321 is taken via lead 327 and fed as the input to the UHF oscillator 329 which, in the preferred embodiment, is operating at 318 MHz. One output of the UHF oscillator is connected via lead 341 to the antenna node 299, and the second output of the UHF oscillator 329 is connected via lead 331 to the input of a divide-by-64 logic circuit 333. The output of the divide-by-64 logic circuit 333 is connected via lead 335 and supplied to the input of a divide-by-20 logic circuit 337. The output of the divide by 20 logic circuit 337 is connected, via lead 338, to the second input of the phase comparator 311 so as to complete a phase-lock loop 339 comprising the phase comparator 311, the loop filter 317, the sense switch 321, and the IF amplifier 307.

The distance measuring system of FIG. 5 differs greatly from the Tellurometric measurement system of FIG. 4 because it is much simpler in at least two very significant ways. In the first place, the basic measurement frequency is the remote RF carrier frequency itself which, in the preferred embodiment of the present invention, is at 318 MHz. Two phase measurements are made in rapid succession. One measurement is made with the master RF carrier frequency displaced above the remote carrier frequency by amount equal to the IF frequency, in the preferred embodiment, approximately 248 KHz. The other or second measurement is made with the master carrier frequency signal displaced below the remote carrier frequency by the same amount. With these two phase measurements, the range or distance can be measured unambiguously and to a high degree of accuracy over the required distance of at least 300 yards, at least for golfing purposes.

Secondly, the phase information from the remote location is communicated to the master location simply by phase-locking the two carriers together. This completely eliminates the necessity of using modulated subcarriers to transmit this information, as was done in the prior art. This, in turn, greatly reduces the occupied bandwidth, simplifies the modulation/demodulation required, and greatly reduces errors introduced by the usual subcarrier filtering processes of the prior art.

In the preferred embodiment of the present invention, the master transceiver 21 includes a frequency synthesizer 251 which may be programmed for 317.7515625 MHz or 318.2484375 MHz. (318 MHz+/−248.4375 KHz), a frequency mixer circuit 267, and IF amplifier 271 tuned to 248.4375 KHz, a crystal oscillator 287 which provides the reference for the frequency synthesizer 251; and, for the phase measurements, a divide-by-16 logic circuit 281 which divides the crystal oscillator frequency down to 248.4375 KHz, and a phase comparator 275. A microcomputer or microprocessor 243 may be used to program the frequency synthesizer 251, display the results of the phase measurements and provide other control functions for the system, as known in the art.

The remote transceiver 23 includes a UHF oscillator 329 whose frequency is controlled by a DC voltage and held at 318 MHz. The system also includes an IF amplifier 307, tuned to 248.4375 KHz, a divider chain which divides the 318 MHz oscillator signal by 1,280 to produce 248.4375 KHz, a phase comparator 311 with a phase error output and an out-of-lock output, a loop filter 317, a controllable switch 321 which can invert the sense or polarity of the loop filter output or not, as necessary, and an out-of-lock detector circuit 323 which periodically changes the sense or polarity of the switch circuit 321 as long as the phase-lock loop is out-of-lock. The sense of the loop filter must be changed to allow the loop to lock whether the received signal carrier frequency is above or below the 318 MHz oscillator frequency of the remote UHF oscillator 329.

In operation, in the absence of a received signal, the out-of-lock detector 323 at the remote transceiver station 23 periodically switches the sense of the loop filter 317 every twenty milliseconds. When a signal is received from the master transceiver station 21, the phase lock loop will lock up when the switch 321 is in the proper state, and the switch 321 will then stay in that state as long as the loop stays locked (i.e. as long as the signal is being received from the master transceiver system 21).

The frequency synthesizer 251 at the master transceiver system, subsystem or station 21 is first programmed for 317.7515625 MHz. This frequency is then transmitted to the remote transceiver system 23.

At the remote transceiver station 23, the first master carrier frequency signal at 317.7515625 MHz is mixed with the 318 MHz signal from the UHF oscillator 329 in the mixer circuit 303. This produces, at the output of the mixer circuit 303, a frequency difference signal of 0.2484375 MHz. This difference frequency is then amplified by the IF amplifier 307 and applied to one input of the phase comparator 311. The other input to the phase comparator is divided-down 318 MHz signal from the UHF oscillator 329.

When the phase lock loop 339 becomes locked, the phase of the IF frequency will equal the difference in phase between the 318 MHz remote oscillator 329 and the received first master carrier frequency signal. This establishes a first known phase reference for the remote position. The 318 MHz signal is then transmitted back to the master transceiver station 21 with the first known phase reference.

At the master transceiver station 21, the 318 MHz remote carrier frequency is mixed with the 317.7515625 MHz oscillator signal from the output of the UHF oscillator 259 to again produce a difference frequency of 248.4375 KHz. This difference signal is amplified by the IF amplifier 271 and supplied to one input of the phase detector 275. The other input of the phase detector 275 is taken from the divided-down logic circuit 281 which divides down the master reference frequency signal 3.975 MHz. The phase detector output will then represent the distance between the master and the remote locations. However, the result is ambiguous because it repeats every 0.511 yards, or every one-half the wavelength of the 317.7515625 MHz signal.

The master transceiver system 21 then has the microprocessor 243 reprogram the frequency synthesizer 251 for a second master carrier frequency signal at 318.2484375 MHz, and the process is repeated. The resulting output from the phase detector 275 is combined with the previous result to produce a digital data signal which represents the distance as a fraction of one-half of the wavelength of 248.4375 KHz signal. Since one-half this wavelength is 327 yards, the measurement is totally unambiguous and highly accurate over a required distance of approximately 300 yards, at least for golfing purposes.

The circuitry of the master transceiver station or system 21 of the block diagram of FIG. 5 will now be described in greater circuit detail with respect to FIGS. 6A and 6B.

In FIG. 6A, the master antenna 67 is connected via the antenna input/output lead 351 to a tap node 353. The tap node 353 is positioned along an inductive coil 355 having one end directly connected to a node 357 and an opposite end connected directly to a node 359. A resistor 361 is connected in parallel across the inductive coil 355 with one end connected to node 357 and its opposite end connected to node 359. Node 359 is connected to an output lead 505, and, via lead 507 to one plate of a capacitor 501 whose opposite plate is connected to lead 506 which serves as an output from the UHF oscillator circuit of block 259 as hereinafter described.

Node 357 is then connected via lead 362 to serve as the input of the mixer circuit 267. The lead from node 357 connects one plate of a variable capacitor 360, the other plate of which is connected via lead 362 to an input node 363 which is connected to ground through an inductive coil 365 and to the gate G1 of the n-channel dual-gate, planar MOS field-effect transistor 370. The source of the field-effect transistor 370 is connected through a resistor 369 to ground, while the drain is connected to an output node 372. The second input gate G2 is connected directly to a node 371, and node 371 is connected to ground through a resistor 373 and to a node 377 via resistor 375. Node 377 is connected via lead 379 to a plus nine volt source of potential. Node 377 is also connected to the parallel combination of a capacitor 381 and a primary coil 385 of a transformer 387. The opposite ends of capacitor 381 and the primary coil 385 are connected to the output node 372 of the field-effect transistor 370. The secondary coil 389 of the transformer 387 has one terminal connected to ground through a capacitor 391 and its opposite terminal connected to a lead 393 which serves as an input to the IF amplifier of block 271.

The IF amplifier 395 may be, for example, a low power, FM IF system such as that manufactured by Signetics Corporation as part #SA/NE604. This chip is a monolithic low power FM IF system incorporating two limiting intermediate frequency amplifiers, a quadrature detector, muting, a logarithmic signal strength indicator, and a voltage regulator.

The input lead 393 is connected to pin P16 of the amplifier 395 which serves as the IF amplifier input. The output is taken via lead 397 from pin P9 which serves as the limiter output. Pin P1 is connected directly to ground, while pin P4 is connected directly to a node 390. Node 390 is connected to a plus nine volt source of potential via lead 392 and through a capacitor 394 to ground. The pin P4 serves as the Vcc input to the chip. Pin P15, which serves as the IF amplifier decoupling input, is connected through a capacitor 396 to a node 398. Node 398 is then connected via lead 402 to a grounded node 404. Node 398 is also connected directly to the P13 pin of the amplifier 395 which serves as the ground connection. Pin P12, which serves as the limiter input, is connected through a capacitor 408 to P14, which serves as the IF amplifier output. Node 404 is connected through a capacitor 406 to a node 410. Node 410 is connected directly to the pin P11 of the amplifier 395 which serves the purpose of limiter decoupling. Pin P10 is connected through a capacitor 412 to node 410, and pin P10 serves as a limiter decoupling input as well.

As previously described, the P9 output is connected via lead 397 to one terminal of a resistor 399 whose opposite terminal is connected through a capacitor 401 to the base electrode of a first NPN transistor 403. Transistor 403 has its collector connected directly to a collector output node 405, and its emitter is grounded. Node 405 is connected via lead 417 to the base of a second NPN transistor 419. The collector electrode of transistor 419 is connected to a plus nine volt source of potential through a lead 421. The emitter of transistor 419 is connected directly to an emitter output node 423. Node 423 is connected through a capacitor 425 to an output lead 427 and through a resistor 429 to ground.

Furthermore, the node 405 is connected through a resistor 407 to a node 409. Node 409 is connected through a resistor 411 to a power input lead 413 which connects to a plus nine volt source of potential, and through a capacitor 415, to ground.

In the loop filter block 255, a pair of input leads 431 and 433 from the frequency synthesizer are connected to first and second input nodes 437 and 441, respectively, via resistors 435 and 439, respectively. The lead 445 connects the positive input node 441 directly to the positive or non-inverting input of an amplifier 450, while the lead 443 connects the negative input node 437 directly to the negative or inverting input of the amplifier 450. Node 441 is connected to ground through the series combination of a resistor 509 and a capacitor 511. The output of the comparator amplifier 450 is taken from output node 453 and a feedback loop is connected from the negative input node 437 to the output node 453 via the series combination of lead 447, resistor 449, and capacitor 451.

The output node 453 is then connected through a resistor 461 to a node 463. Node 463 is connected to ground through a capacitor 465 and to lead 464, which serves as an input to the UHF oscillator of block 259 of FIG. 5. Input lead 464 connects through a resistor 467 to a node 469. Node 469 is connected to a data modulation input from microprocessor 243 of FIG. 5 via lead 473, and is also connected, via lead 480, to a second node 478. Node 478 is connected to ground through a capacitor 471 and to the cathode of a voltage-controlled diode 475 whose anode is connected to a node 477. Node 477 is connected to ground through an inductive coil 479 in parallel with the series combination of the voltage controlled diode 475 and capacitor 471. Node 477 is also connected, via lead 482, to the collector of a PNP transistor 481. The base of transistor 481 is connected directly to a base input node 493. Node 493 is connected to ground through the parallel combination of a resistor 495 and a capacitor 497, and it is also connected to one terminal of a resistor 491 whose opposite terminal is connected to a node 489. Node 489 is connected to ground through a capacitor 499 and to one terminal of a resistor 487 whose opposite terminal is connected to the emitter node 485 of the PNP transistor 481. Node 485 is also connected to the oscillator output lead 506, as previously described.

As known in the art, transistor 403 of amplifier block 271 is used as a level translator, while transistor 419 is used as an emitter follower for buffer purposes. The UHF oscillator 259 employs the voltage-controlled diode 475 and the inductive coil 479 to act as a tunable tank oscillator.

Figure 6B:
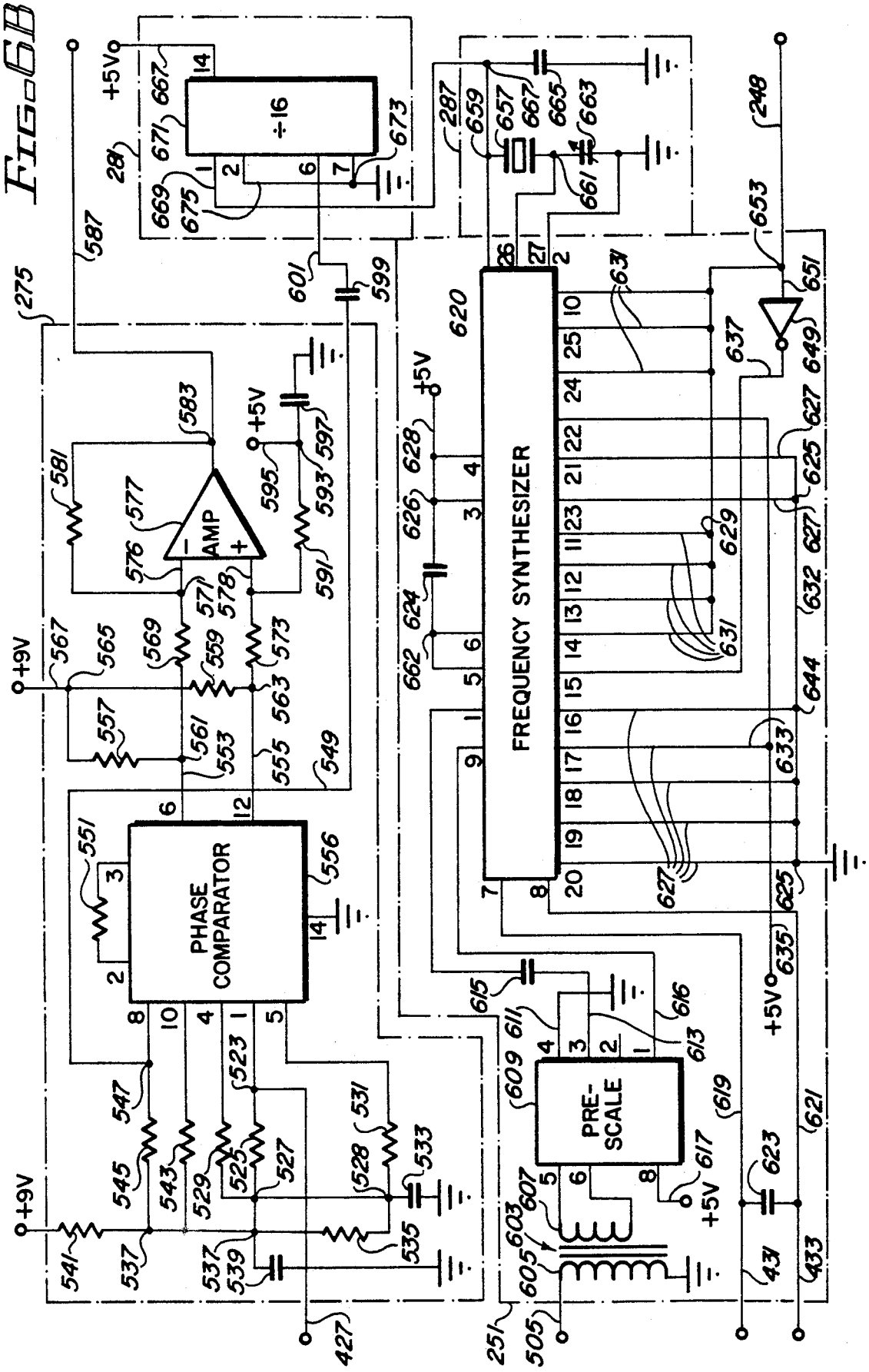

Referring now to FIG. 6B, the remaining portions of the master transceiver system 21 of FIG. 5 will now be described. The leads 431 and 433 to the loop filter 255 of FIG. 6A, are coupled via leads 619 and 621 to the Pin 7 and Pin 8 outputs of the frequency synthesizer 620, respectively. A capacitor 623 is connected between the leads 619 and 621.

The frequency synthesizer 620 may be, for example, a parallel input PLL frequency synthesizer such as that manufactured by Motorola and sold as model #MC145152-1. The parallel input phase lock loop frequency synthesizer 620 is programmed by sixteen parallel inputs. The device features include a reference oscillator, a selectable reference divider, a two output phase detector, a ten bit programmable divide-by-n counter, and a six bit programmable divide-by-A counter. When combined with a loop filter and a VCO (voltage controlled oscillator), the device can provide all of the remaining functions for a phase lock loop frequency synthesizer, operating up to the device's frequency limit. The P7 pin serves as the phase "R" output, while P8 serves as the phase "V" output. An input signal is taken from lead 505 of FIG. 6A and connects to one terminal of the primary coil 605 of transformer 603. The opposite terminal of the primary coil 605 is grounded. The secondary coil 607 of the transformer 603 has one terminal connected to the P5 pin and the opposite terminal connected to the P6 pin of a prescaler 609. The prescaler may be, for example, a low power, two-modulus prescaler such as that manufactured by Motorola and sold as part #MC12025, hereinafter referred to as prescaler 609. Pin P5 serves as a negative input, while pin P6 serves as the positive input. Pin P8 is connected through a lead 617 to a plus five volt source of potential, and the pin P8 supplies the power to the prescaler 609. The P4 pin is connected directly to ground via lead 611, and the P3 pin is connected via lead 613 through a capacitor 615 to the P1 input of the frequency synthesizer 620. The P3 pin of the prescaler 609 serves as the output of the chip. The P2 pin is shown as being unconnected, while the pin P1 is connected via lead 616 to the P9 output of the frequency synthesizer 620. The pin P1 of the prescaler 609 serves as the modulus input.

The frequency synthesizer 620 further includes a P5 pin or RA1 port, and a P6 or RA2 port or pin. These pins are connected together at a common node 622, and node 622 is connected through a capacitor 624 to a node 626. Node 626 is connected directly to pin P3 and pin P4 of the frequency synthesizer 620. Pin P3 serves as the Vdd input while the P4 pin serves as the RAO input.

The node 626 is also connected via lead 628 to a plus five volt source of potential.

Pins P10 through P25 control the divide ratio of the synthesizer divider as described in the Motorola data manual. Pins P16, P18, P19, and P20 are connected, via leads 627, to a common node 625, which is then connected directly to ground. Pins P11, P12, P13, P14, P24, and P25, are commonly connected via leads 631 to a common node 629 which is then connected via lead 655 back to a node 653.

Furthermore, a plus five volt source of potential is connected via lead 635 to a power input node 644, which is then connected directly to the P17 pin of the frequency synthesizer 620 via lead 633 and, via lead 632, directly to pin P22 of the frequency synthesizer 620. An input lead 248, which corresponds to the output 249 of the microprocessor of FIG. 5, is connected to node 653. Changing node 653 from a low logic level to a high logic level changes the master carrier frequency from f1 (317.7515625 MHz) to f2 (318.2484375 MHz). Node 653 is connected to the common nodes 629 via lead 655, as herebefore described. Furthermore, node 653 is connected through a lead 651 to the input of an inverter 649. The output of the inverter 649 is connected directly to the lead 637, which, in turn, connects directly to pin P15 input of the frequency synthesizer 620. Pin P26 and pin P27 of the frequency synthesizer 620 serve as the oscillator input and the oscillator output, respectively. Pin P26 is connected directly to a node 659, while pin P27 is connected directly to a node 661. A crystal 657 is connected between the nodes 659 and 661. Furthermore, pin P2, which serves as the Vss input which is connected to ground. Node 661 is connected through a variable capacitor 663 to ground, while node 659 is connected directly to a node 667. Node 667 is connected to ground through a capacitor 665 and to the pin P1 input of a divide-by-sixteen counter circuit 671 via lead 669. The pin P2 of the divide-by-sixteen counter 671 is connected, via lead 675, to a node 673 which is then grounded. Node 673 is connected to the P7 pin of the divide-by-sixteen counter 671. The pin P14 is connected via leads 667 to a plus five volt source of potential. The divide-by-sixteen counter may be, for example, a conventional divide-by-sixteen counter such as a high speed CMOS logic device, known as an asynchronous, seven-bit, binary counter, such as that manufactured by Texas Instruments and sold as model "SN74HC4024. This device is an asynchronous seven-stage binary counter designed with an input pulse-shaping circuit. The outputs of all stages are available externally. The count is advanced on the high-to-low transition of the clock pulse. The clock input P1 is connected via lead 669 to the node 667, as previously described, and the P6 output is connected via lead 601 and capacitor 599 back to node 547 at the P8 input of the phase detector 556 of block 275, as previously described. The block 287, which includes the crystal oscillator 657, is used to represent the reference frequency generator 287 of FIG. 5, while the divide-by-sixteen counter 671 corresponds to block 281 of FIG. 5. The combination of the prescaler 609 and the frequency synthesizer 620 serves as the frequency synthesizer of block 251 of FIG. 5.

Output lead 427 from FIG. 6A serves as the input to the phase detector circuitry of block 275 of FIG. 5. Lead 427 is connected directly to an input node 523. Node 523 is connected directly to the P1 pin input of the phase detector 556, and, via resistor 525, to a node 527. Node 527 is connected to the P4 pin input via resistor 529 and to another node 528 via lead 530. Node 528 is connected to (1) the P5 pin input of the phase detector 556 via resistor 531, (2) through a capacitor 533 to ground, and (3) to a node 537 via resistor 535. Node 537 is then connected to (1) a plus nine volt source of potential via resistor 541, (2) to the P8 pin input via resistor 545, and (3) to the P10 pin input via resistor 543.

Pin P2 is connected to pin P3 through a resistor 551, and the P14 pin is directly connected to ground. Pin P6 is connected to an output node 561 via lead 553 while the P12 pin output is connected to an output node 563 via lead 555. Output lead 549 connects the P8 pin input node 547 to the input of the divide-by-sixteen logic circuit 281 via capacitor 599 and input lead 601. Node 561 is connected to the +9 V source of potential via resistor 557, a node 565, and a lead 567. Node 565 is then connected to node 563 via resistor 559. Node 563 is connected to the positive input node 575 via resistor 573, while node 561 is connected to negative input node 571 via resistor 569.

The positive input node 575 is connected to the positive input of a comparator 577 via input lead 578, while the negative input node 571 is connected to the negative input of comparator 577 via the negative input lead 576. The comparator output is connected via comparator output lead 585 to a comparator output node 583. Node 583 is connected via lead 587 to the microprocessor circuit of FIG. 5, and, via feedback resistor 581 back to the negative input node 571. Lastly, the positive input node 571 is also connected to a node 593 via a resistor 591. Node 593 is then connected to a +5 V source of potential via lead 595, and to ground through a coupling capacitor 597.

The remote transceiver system 23 of FIG. 5 will now be described more specifically, with reference to the schematic diagrams of FIGS. 7A and 7B.

Figure 7A:
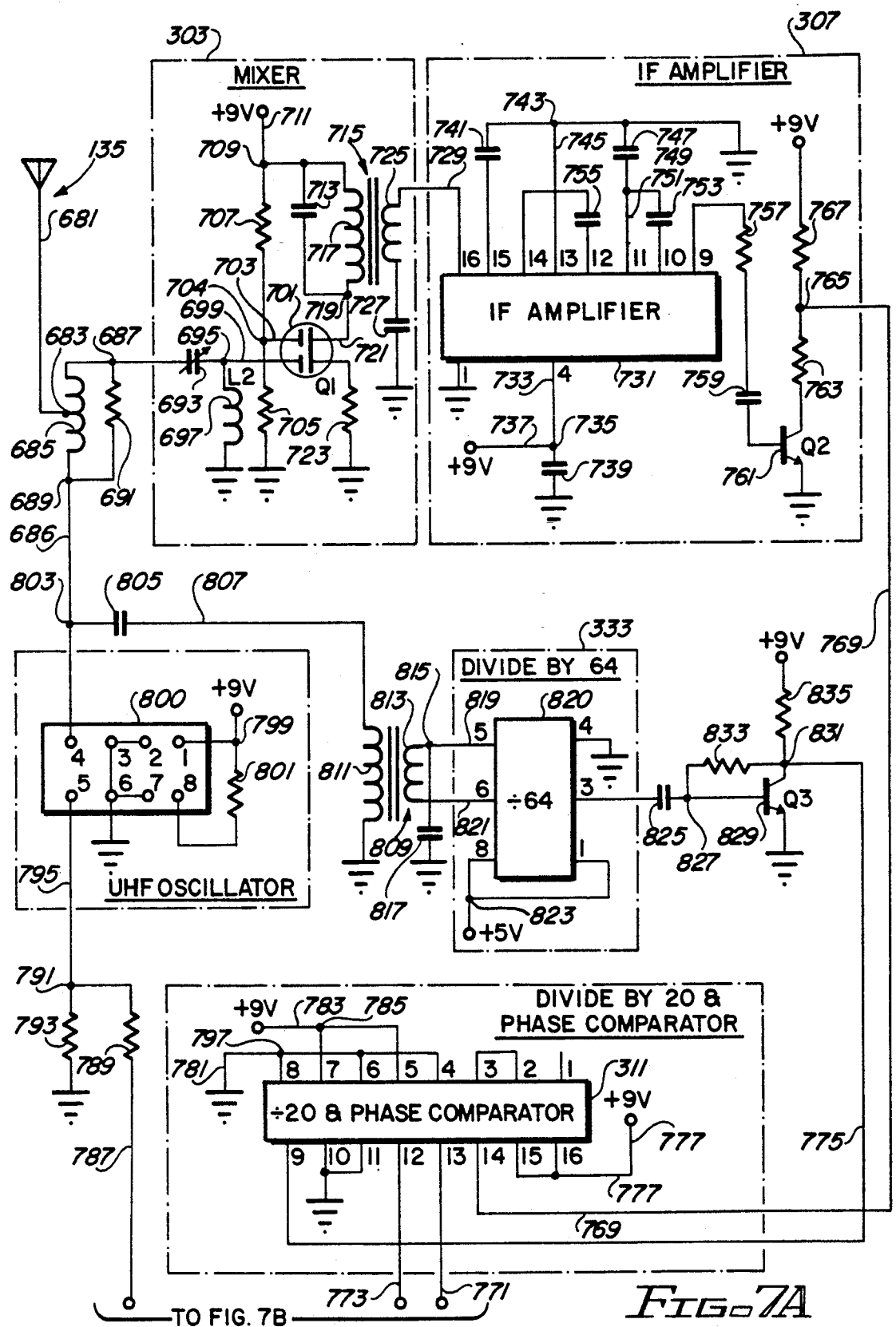
FIGS. 7A and 7B are electrical schematic diagrams of the remote transceiver portion of the block diagram of FIG. 5.

In FIG. 7A, the remote antenna 135 is connected via the input/output antenna lead 681 to a tap or node 683. The node 683 is a tap on an inductive coil 685 having one terminal connected to a node 687 and its opposite terminal connected to a node 689. A resistor 691 is connected in parallel across the inductive coil 685 with one terminal connected to node 687 and its opposite terminal connected to node 689.

Node 687 is connected to the input of the mixer circuit 303 of FIG. 5 and supplied to one plate of a variable capacitor 693 whose opposite plate is connected to a node 695. Node 695 is connected to ground through an inductive coil 697 and, via lead 699, to the G1 input of the field-effect transistor 701. The G2 input is connected via lead 703 to a node 704. Node 704 is connected to ground through a resistor 705 and to a node 709 through a resistor 707. Node 709 is connected via lead 711 to a plus nine volt source of potential. Node 709 is also connected to one terminal of a capacitor 713, and to one terminal of the primary coil 717 of a transformer 715. The opposite terminal of the primary coil 717 and the opposite plate of capacitor 713 are connected to a node 719 which is connected directly to the drain of the field-effect transistor 701 via lead 721. The source of the field-effect transistor 701 is connected to ground through a resistor 723.

The secondary coil 725 of the transformer 715 is connected through a capacitor 727 to ground, and, via lead 729, to serve as the input to the IF amplifier circuit 307. The IF amplifier 731 may be, for example, the same as the low power FM IF amplifier previously discussed with reference to FIGS. 6A and 6B. The P1 pin of amplifier 721 is grounded, while pin P4 is connected via lead 733 to a node 735. Node 735 is connected to ground through a capacitor 739 and via lead 737 to a plus nine volt source of potential. Additionally, pin P15 is connected through a capacitor 741 to a node 743. Node 743 is connected via lead 745 to pin P13 of the IF amplifier 731. Pin P14 is connected through a capacitor 755 directly to pin P12 and pin P11 is connected via lead 751 to a node 749. Node 749 is connected through a capacitor 753 to pin P10 of the IF amplifier 731 and through a capacitor 747 to the node 743 which is grounded. The output is taken from pin P9 and supplied through the series combination of a resistor 757 and capacitor 759 to the base electrode of an NPN transistor 761 whose emitter electrode is grounded. The collector electrode of the transistor 761 is connected through a resistor 763 to output node 765. Node 765 is connected through a resistor 767 to a plus nine volt source of potential, and to an output lead 769 which serves as the input to pin P14 of the phase comparator 311 of the block diagram of FIG. 5.

The phase comparator 311 may be, for example, a phase comparator with programmable counters such as that manufactured by Motorola and sold as part #MC14568B. This device includes a phase comparator, a divide-by-four, sixteen, sixty-four, or one hundred counter, and a programmable divide-by-"n" four-bit binary counter, constructed with MOS, P-channel and N-channel enhancement mode devices in a monolithic structure. Pin P1 is open while pin P2 is connected directly to pin P3. Pins P4, P6, and P8 are commonly connected to node 779 which is connected to ground via lead 781. Pin P5 is directly connected to pin P7 at node 785, which is then connected via lead 783 to a plus nine volt source of potential. The lead 777 also connects the plus nine volt source of potential to pins P15 and P16. P12 and P13 supply phase comparator outputs on leads 773 and 771, respectively. Pins P10 and P11 are commonly connected to ground, while pin P9 is connected via lead 775 back to node 831 of the divide-by-64 circuit 333.

An input lead 787 from switch 321 is connected through a resistor 789 to a node 791 which is grounded through a resistor 793. Node 791 is also connected via lead 795 to the pin P5 of the UHF oscillator 800 of block 329 of FIG. 5. The UHF oscillator 800 may be, for example, a 318 MHZ FSK hybrid transmitter such as that manufactured by RF Monolithics, Inc. of Dallas, Tex. and referred to as a HO-1008 device. This device is an FSK-modulated hybrid transmitter designed for performance at 318 MHz wireless control. Lead 795 connects directly to pin P5, while pins P2, P3, P6, and P7 are directly connected to ground. Input pin P4 is connected directly to node 803, and node 803 is connected back to node 689 via I/O lead 686. Node 803 is also connected through a capacitor 805 and a lead 807 to the one terminal of a primary coil 811 of a transformer 809, and the opposite end of the primary coil 811 is grounded. Pin P1 is connected to a plus nine volt source of potential at node 799, and node 799 is connected through a resistor 801 back to pin P8 of the UHF oscillator 800.

The secondary coil 813 of the transformer 809 has one terminal connected to a node 815. Node 815 is connected via lead 819 to the P5 input pin of a divide-by-sixty-four counter 820. The opposite terminal of the secondary coil 813 is connected via lead 821 to the P6 terminal. Node 815 is also connected to ground through a capacitor 817. Pins P1 and P8 are directly connected to a voltage input node 823 which is then connected directly to a plus five volt source of potential. Pin P4 is grounded, and pin P3 serves as the output of the divide-by-sixty-four four counter 820, and is connected through a capacitor 825 to an input node 827. Node 827 is connected directly to the base electrode of NPN transistor 829 whose emitter is grounded. The collector of transistor 829 is connected to a collector output node 831. Node 831 is connected through a resistor 835 to a plus nine volt source of potential, and through a resistor 833 back to the base input node 827. The collector output node 831 is connected via lead 775 to Pin P9 of the combined divide-by-twenty circuit and phase comparator 311 of FIG. 7A.

Figure 7B:
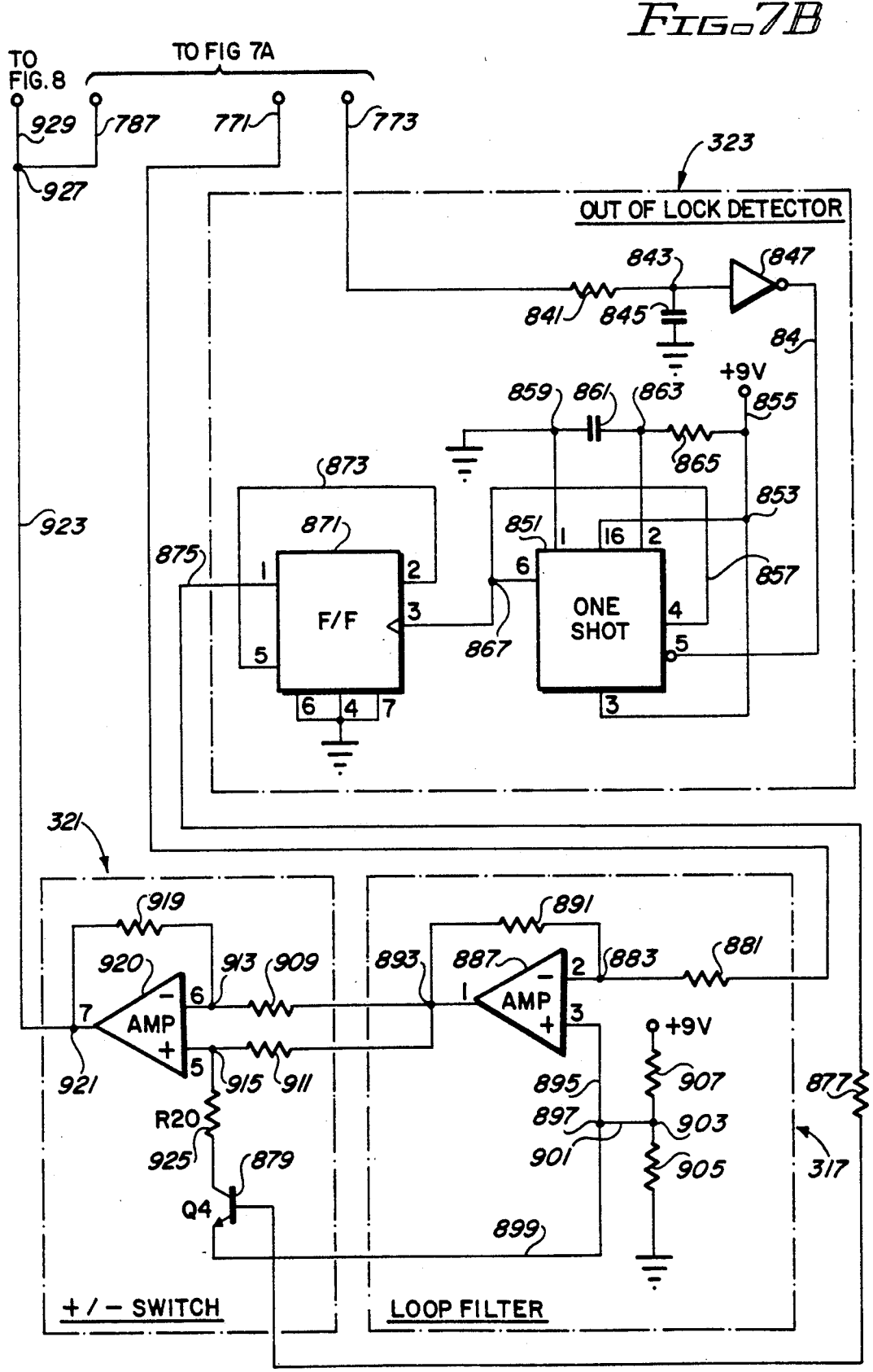

FIG. 7B shows the remaining portion of the remote transceiver station 23 of the block diagram of FIG. 5 in schematic detail. Input lead 773 is connected as one input of the out-of-lock detector circuit 323, and connects through a resistor 841 to a node 843. Node 843 is grounded through a capacitor 845, and is connected directly to the input of an inverter 847. The output of the inverter 847 is connected via lead 849 to Pin P5 of a one-shot multivibrator 851. The one-shot multivibrator 851 may be, for example, a COS/MOS dual precision monostable multivibrator such as that manufactured by RCA as device #CD4538B. This dual precision monostable multivibrator provides stable retrigerable/resetable one-shot operations for any fixed voltage timing applications. Pin P3 of the one-shot multivibrator 851 is connected directly to node 853. Node 853 is connected directly back to pin P16 and through a lead 855, to a plus nine volt source of potential. The plus nine volt source of potential is also connected via lead 855 to a node 863 via resistor 865. Node 863 is directly connected to pin P2 of the one-shot 851, and through a capacitor 861 to a grounded node 859 which is also connected directly to pin P1. Pin P4 is connected via lead 857 to node 867, and node 867 is connected directly to pin P6 of the one-shot 851 and, via lead 869, to pin P3 of the D-type flip-flop 871. The flip-flop 871 may be, for example, a conventional D-type flip-flop such as an RCA CD4013 type flip flop, conventionally known in the art. Pin P2 is connected via lead 873 back to pin P5, while pins P4, P6 and P7 are grounded. The pin P1 supplies the output of the flip-flop 871 via lead 875 through a resistor 877 to the base of the NPN transistor 879 of the polarity or sense switching circuit of block 321 of FIG. 5.

The collector of transistor 879 is connected through a resistor 925 to the positive input node 915 of an amplifier 920. The negative input node 913 of the amplifier 920 is connected through a feedback resistor 919 to the amplifier output node 921. Node 921 is connected directly to the output of the amplifier 920 and, via output lead 923, to the output node 927 which supplies outputs on both leads 787 and leads 929, for use by the frequency synthesizer and the data receiver 938 as hereinafter described. The negative input node 913 is connected through a resistor 909 to an output node 893 of the loop filter 317 of FIG. 5. Node 893 is taken directly from the output of the amplifier 887, and node 893 is also connected through a resistor 911 to the positive input node 915 of the amplifier 920. The amplifier 887 has its negative or inverting input connected directly to the negative input node 883 via lead 885. Node 883 is connected in a feedback loop to the output node 893 via resistor 891. The negative input node 883 is also connected through a resistor 881 back to the input lead 771. The positive or non-inverting input of the amplifier 887 is connected via input lead 895 to the positive input node 897. Node 897 is connected to node 903 via lead 901, and node 903 is connected to ground through a resistor 905 and to a plus nine volt source of potential through a resistor 907. Node 897 is also connected through a lead 899, to the emitter electrode of transistor 879.

The circuit of FIG. 8 is used to allow the remote transceiver station to positively identify a data signal from the master transceiver system, indicating the particular hole toward which the golfer is presently advancing his ball. If a positive verification of identity exists, an enablement signal will be generated to begin transmission of the remote carrier frequency back to the master transceiver station to indicate that the distance is being measured to the proper hole.

In FIG. 8, input lead 929 is taken from the FM detector at the output of the amplifier 920 of FIG. 7B. This input is connected via lead 929 and serves as the input to the data receiver 938 which decodes the modulation of the signal from the master oscillator. Lead 929 is connected to input node 931. Input node 931 is connected through a resistor 933 to a positive input node 935 which is connected directly to the plus input of the comparator 940. Similarly, node 931 is connected through a resistor 941 to a negative input node 943, which is, in turn, connected directly to the negative input of the comparator 940. Node 943 is also connected to ground through a capacitor 945, and the positive input node 935 is connected to the amplifier output node 939 via feedback resistor 937. The output node 939 is connected directly to the output of the comparator 940 and, via output lead 947, is supplied to the DI input of the decoder 949 of block 951. The decoder 949 may be, for example, a conventional encoder/decoder such as that manufactured by Motorola as an MC145027 integrated circuit. In the decoder 949, the Vdd pin is connected to a plus nine volt source of potential via lead 953. The outputs D6, D7, D8, and D9 are open, and the output VT is connected via lead 987 to one input of a logical NOR gate 991 of the monostable vibrator 1005 of FIG. 8.

The Vss port of the decoder 949 is connected directly to ground, while the C1 input is connected via lead 965 to a node 969. Node 969 is connected to ground through a capacitor 971 and to the R1 input of the decoder 949 through a resistor 967. The encodeable inputs A1, A2, A3, A4, and A5 are connected via the switch assembly 973, including switch arms 975, 977, 979, 981, and 983, respectively, to a common ground node 985. These switches 973 allow the decoder 949 to be pre-programmed with its unique hole identification number positively identifying that unique hole. The R2/C2 input of the decoder 949 is connected via lead 955 to a node 957, which, in turn, is connected to a ground node 963 through the parallel combination of a resistor 959 and a capacitor 961.

As previously stated, the VT output of the decoder 949 is connected via lead 987 to one input of a logical NOR gate 991 comprising the input of the monostable vibrator 1005. The output of the logical NOR gate 991 is connected through a coupling capacitor 993 to a node 995. Node 995 is connected through a resistor 999 to a plus nine volt source of potential, and to the commonly coupled inputs of a second logical NOR gate 997. The output of the second logical NOR gate 997 is supplied to output lead 1001, and is also connected back through lead 1003 to the second input of the first logical NOR gate 991 to form a conventional monostable multivibrator configuration 1005.

In operation, the computer of the master transceiver station generates a data code indicative of the particular hole toward which the golfer is advancing his ball and toward which the distance is to be measured. This digital data code is used to modulate the master carrier frequency signal and transmitted thereby to the remote transceiver system. The ID data at the remote station then detects the ID, and if it matches the unique hole ID set by the switches 973, it triggers the monostable multivibrator or "one shot" 1005 to generate an enablement signal for approximately 100 ms. This is long enough for both of the distance measurements to take place. Furthermore, the enablement signal turns the remote UHF oscillator transmitter on so that the remote transceiver sends the remote carrier frequency back to the master transceiver station to indicate that a positive verification of the hole identification has been made.

FIG. 9 is a flow diagram explaining the basic operation of the master transceiver system of the present invention. In FIG. 9, the block 1029 indicates that a request for measurement has been made. The output path 1030 is connected to a block 1031 which requires that the master transceiver system set the frequency to f1 or the first master carrier frequency signal. The output path 1032 then connects to block 1033 which requests the computer to transmit the identification data indicating the proper hole number and the output path 1034 connects to block 1035 which requires that the master transceiver station transmits the identification data by frequency modulating (in the preferred embodiment hereof) the first master carrier frequency signal and transmitting same to the remote transceiver station. The output path 1036 then connects to block 1037 which requires that the master transceiver station wait for a response. The output path 1038 then connects to block 1039 where the first phase measurement is inputted. The output path then goes via path 1040 to block 1041 which requires that the computer set the second master carrier frequency signal by controlling the frequency synthesizer. The output path 1042 then goes to block 1043, again requiring that the master transceiver station waits for a response. Path 1044 connects to block 1045 which requires the master transceiver station to input the second known phase reference supplied from the remote transceiver system. Path 1046 then connects to block 1047 and requires that the computer calculate the phase differences between the first and second known phase references.

Path 1048 then connects to the query block 1049 which asks whether or not the phase difference is negative. If the phase difference is negative, yes path 1050 connects to block 1053 requiring that 360 degrees be added, and then via path 1054 to node 1052. If the answer was no, the no path 1051 goes directly to node 1052 and then is supplied, via path 1055, to block 1056. Block 1056 requires that the computer calculate the distance in yards measured between the present lie of the golf ball and the particular hole toward which the golfer is presently advancing said golf ball. Path 1057 then goes to block 1058 which requires that the computer update the displays on the housing of the master transceiver station and output path 1059 then goes to block 1060 requesting that the program or method return to the main program. This, in effect, summarizes the operation of the master transceiver system.

FIG. 10 is a flow diagram of the start-up procedure and information update of the present invention. Block 1061 requires the system to be powered up, and path 1062 to block 1063 requires that the memory, IO's, and displays be initialized. Path 1064 then goes to the main program indicated by block 1065, and then via path 1066 and node 1067 to block 1068 which asks that the keys be scanned. The output then goes via path 1069 to a first query block 1071 which asks whether or not the keys have been depressed.

If the answer is no, the no path 1072 is followed back to node 1067, but if the answer is yes, the yes path 1073 is followed to the input of a second query block 1074. Block 1074 asks whether or not the step key has been operated to update the master transceiver system for the next hole toward which the golfer is advancing his ball. If the answer is yes, the yes path 1075 proceeds to block 1078 and if the answer is no, the no path 1076 goes directly to the block 1077 which requires that the measurement be made.

Block 1078 requires that the hole number be incremented and then, via path 1079, it goes to the input of a third query box 1080. Box 1080 asks whether or not the hole number is greater than 18. If the answer is no, it proceeds via no path 1084 and node 1085 to path 1086 and into block 1087 which requires that the displays be updated. If the answer is yes, it proceeds via the yes path 1081 to block 1082 which requires that the hole number be set to 1. The output path 1083 then connects back to node 1085 and on to the display update box 1087 via path 1086.

It will be understood, that while specific frequencies of operation were given to describe the preferred embodiments of the present invention, and specific integrated circuits were indicated, that substitutions could be made freely by those knowledgeable in the related arts. It will also be recognized that different frequencies and components can be used for measuring greater and/or lesser distances than those normally needed for golf applications.

It will also be recognized by those of ordinary skill in the art that various modifications, variations, substitutions, changes, and alterations can be made in the form, structure, circuitry, and method of operation of the present invention without departing from the actual spirit and scope thereof, which is limited only by the appended claims.

We claim:

1. A distance measuring system for use on a golf course including a plurality of different and distinct, consecutively numbered holes, each hole having a unique hole number for positively identifying same, each of said holes having a flag marker associated therewith for visually identifying its corresponding unique hole number, and wherein a golfer attempts to advance a golf ball toward each of said plurality of numbered holes in consecutive order for playing a round of golf, said distance measuring system comprising:

a remote transceiver means and a master transceiver means including a master transceiver circuit means and a housing means for substantially enclosing said master transceiver circuit means, said housing means including a master antenna means for transmitting and receiving radio signals, a manually-operable means for initiating a request for a distance measurement signal, a display panel means for visually indicating the measured distance, and a means for visually indicating the unique number of the hold toward which the golfer is presently advancing his golf ball;

said master transceiver circuit means including:
a crystal oscillator means for generating a predetermined fixed reference frequency signal;
a frequency synthesizer means, including a master UHF oscillator means and a loop filter means, for converting said fixed reference frequency signal into a first desired master carrier frequency signal;
a computer means for programming said frequency synthesizer means to generate said first master carrier frequency signal at said first desired frequency;
means for operatively coupling said first master carrier frequency signal to said master antenna means for transmission to said remote transceiver means;
master mixer means for receiving a first return signal from said remote transceiver means and mixing same with said first master carrier frequency signal for producing a first frequency difference signal;
master IF amplifier means for amplifying said first frequency difference signal;
a master frequency divider circuit means for dividing down said crystal oscillator fixed frequency reference signal to produce a divided-down reference signal;
a master phase detector means having first and second inputs and a phase detector output, the first one of said inputs being operably connected to the output of said master frequency divider circuit means for inputting said divided-down reference signal thereto, and the second one of said inputs being operatively coupled to the output of said master IF amplifier means for inputting said first IF-amplified frequency difference signal thereto, the output of said phase detector means representing a first distance between the golfer's ball and said properly numbered hole;
said computer means having an input operably connected to the output of said master phase detector means for inputting said first distance measurement signal thereto, said computer means converting said first distance measurement signal into a first digital data signal;
said remote transceiver means including:
means for operatively mounting same at said flag marker;
a remote antenna means for transmitting and receiving signals to and from said master transceiver means;
a remote UHF oscillator means for generating a fixed remote carrier frequency signal;
a remote mixer means for mixing said received first master carrier frequency signal with said remote carrier frequency signal to output a first remote difference frequency signal;
a remote IF amplifier means for amplifying said first remote difference frequency signal and outputting same;
remote digital frequency divider means for dividing down said remote carrier frequency signal to produce a remote divided-down signal;

a remote phase comparator means having first and second inputs and first and second outputs, said first input being operably connected to the output of said remote digital frequency divider means for inputting said first remote divided-down signal and said second input being operably connected to the output of said remote IF amplifier means for inputting said IF-amplifier first remote difference frequency signal thereto, said first output generating a first known phase reference signal for the remote position and said second output generating a control signal for out-of-lock detection purposes;

a remote loop filter means for filtering said first output of said remote phase comparator means said remote loop filter means and said remote UHF oscillator means forming a phase-locked loop;

a remote out-of-lock detector circuit means having an input operatively coupled to said second output of said remote phase comparator means for monitoring said control signal and for generating a predetermined sequence of plus and minus sense-switching signals whenever said phase-lock loop is in an out-of-lock state; and sense switching means coupled to the loop filter means and to the detector circuit means for periodically switching the polarity of the output of said remote loop filter means whenever said out-of-lock detector means detects an out-of-lock condition for said phase-lock loop, and for continuing to pass said filtered first known phase reference signal to said remote UHF oscillator means for transmitting said back to said master transceiver means via said second antenna means whenever said phase-lock loop is in a locked position.

2. The distance measuring system of claim 1 wherein said computer means comprises means for providing first and second digital data signals to said frequency synthesizer means to alternately produce first and second master carrier frequency signals;

said remote transceiver means receiving said second master carrier frequency signal and outputting a second known phase reference signal for transmission back to said master transceiver means via said remote carrier frequency signal for a second distance measurement; and said master transceiver means receiving said second known phase reference signal and producing a second measurement signal which is supplied to said computer means to resolve said ambiguity and produce a second digital data signal free from ambiguity over the required measurement distance.

3. The distance measuring system of claim 2 wherein said computer initially generates a digital data ID signal means, indicative of the unique hole identification number of the hole toward which the golfer is presently advancing his golf ball, for modulating said first master carrier frequency signal for transmission to said remote transceiver means;

said remote transceiver means further including hole identification circuit means responsive to said digital data ID signal carried by said first master carrier frequency signal for generating an enablement signal in response to a positive match between the digital data ID signal and a data-encoded signal indicative of said hole number; and said remote UHF oscillator means being responsive to said enablement signal for generating said remote carrier frequency signal and transmitting same back to said master transceiver means for verifying that the correct remote transceiver means is being contacted for the distance measurement.

4. A digital distance measurement system for use on a conventional golf course which includes a plurality of sequentially numbered different and distinct holes, each hole being identified by a flag marker pin having a lower end portion adapted to be removeably inserted into the hole and an upper and portion adapted to be vertically positioned above said hole and further including a hole marker flag bearing a visual indication of that hole's unique hole identification number in said sequence of holes, and wherein at least one golfer attempts to advance his golf ball toward and into each successively numbered hole to play a round of golf, said digital distance measuring system comprising:

a single matter transceiver means adapted to be positioned at least one of adjacent, abeam, and over the position of the golf ball on the course and a display means for visually indicating at least the number of the hole being approached and the measured distance from the ball to the desired hole; and a plurality of remote transceiver means, one of said remote transceiver means for each unique, sequentially-numbered hole, each of said remote transceiver means being adapted to be operatively carried by the corresponding flag marker of said hole;

said master transceiver means including:

(1) manually operable means for generating a distance measurement request signal indicative of the need for a measurement of the distance between the present lie of the golf ball and the hole toward which the golfer is advancing;

(2) means responsive to said distance measuring request signal for generating a first master carrier frequency signal and a data signal indicative of the approached hole's unique hole identification number; and (3) means for transmitting said data signal to said remote transceiver means by modulating said first master carrier frequency signal therewith;

said remote transceiver means including:

(1) means responsive to the reception of said digital data signal for determining if that particular hole corresponds to the hole identified thereby, and for generating a command signal for a predetermined period of time whenever a positive identification exists;

(2) means responsive to said control signal for generating a fixed remote carrier frequency signal and transmitting same back to said master transceiver means to verify that the distance to be measured is to the proper hole;

(3) means responsive to said first master carrier frequency signal and to said remote carrier frequency signal for generating a first frequency difference signal indicative of the difference in frequency therebetween;

(4) means for dividing-down said remote carrier frequency signal to produce a remote divided-down signal;

(5) means responsive to said remote divided-down signal and said first frequency difference signal for generating a first known phase reference signal; and (6) means for transmitting said first known phase reference signal back to said master transceiver means via said remote carrier frequency signal;

said master transceiver means further including:

(4) means responsive to said first known phase reference signal for reproducing said first frequency difference signal;

(5) means for dividing down said master carrier reference frequency signal to produce a master divided-down signal; and (6) means responsive to said first frequency difference signal and said master divided-down signal for generating a first measurement signal indicative of the distance between the position of the golf ball on the golf course and the position of the hole toward which the golfer is currently advancing his golf ball;

said master transceiver means further including:

(7) means for reprogramming said generating means for generating a second different and distinct master carrier frequency signal; and (8) said means for generating said master carrier frequency signals now generating said second master carrier frequency signal and transmitting same back to said remote transceiver means for a second distance measurement;

said remote transceiver means being responsive to the reception of said second master carrier frequency signal for:

(7) generating a second frequency different signal indicative of the difference in frequency between said second master carrier frequency signal and said fixed remote carrier frequency signal;

(8) comparing said second frequency difference signal and said first divided-down remote carrier frequency signal for generating a second known phase reference signal; and (9) transmitting said second known phase reference signal back to said master transceiver means via said remote carrier frequency signal; and wherein said master transceiver means is responsive to said second known phase reference signal for:

(9) reproducing said second frequency difference signal;

(10) generating a second measurement signal in response to said second frequency difference signal and said second divided-down master frequency reference signal, said second measurement being indicative of the measured distance as a fraction of one-half of the wavelength of said second master carrier frequency signal; and

(11) converting said second measurement signal into digital data and combining the two digital data signals to generate a final distance measurement signal equal to the actual measured distance between the location of the golf ball on the golf course and the position of the desired hole without ambiguity and to a high degree of accuracy.

5. The digital distance measuring system of claim 4 wherein said means responsive to said distance measuring request signal includes computer means for sequentially programming said transmitting means with programmed data for generating said first and second predetermined desired master carrier frequency signals, for generating said data signal indicative of the unique number of the particular hole toward which the golfer is presently advancing his golf ball, and for converting said first and second measurement signals into digital data for visually displaying the measured distance on said digital display panel means.

6. The digital data measuring system of claim 5 wherein said means for transmitting said first and second master carrier frequency signals includes:

master crystal oscillator means for generating a master reference frequency signal;

frequency synthesizer means responsive to said master reference frequency signal and to said programmed data from said computer means for generating said first and second master carrier frequency signals, respectively; and means operably connecting the output of said frequency synthesizer means to said antenna for transmitting said first and second master carrier frequency signals, sequentially, to said remote transceiver means.

7. The digital distance measuring system of claim 6 wherein said master transmitting means further includes:

a master loop filter means for filtering the output of said frequency synthesizer means;

a master modulating means coupled to the output of said master loop filter means for modulating said first master carrier frequency signal with said data signal indicative of the desired hole identification number, and for outputting a modulated first master carrier frequency signal to said master transceiver antenna means for transmission to said remote transceiver means.

8. The digital distance measuring system of claim 7 wherein said means responsive to said first and second known phase reference signals for reproducing said first and second frequency difference signals includes:

master mixer means for sequentially mixing said first and second known phase reference signals with said first and second master carrier frequency signals, respectively, to reproduce said first and second frequency difference signals respectively;

master IF amplifier means for sequentially amplifying said first and second frequency difference signals for outputting same.

9. The digital distance measuring system of claim 8 wherein said means for dividing down said master reference frequency signal for said frequency synthesizer means includes a master digital divide-by-"n" logic circuit means for producing said first and second divided-down signals, respectively, and outputting same.

10. The digital distance measuring system of claim 9 wherein said means for generating said first and second measurement signals includes a master phase detector means having first and second inputs and an output, said master phase detector means having said first input operably connected to the output of said master digital divide-by-"n" logic circuit means for sequentially receiving said first and second divided-down signals therefrom, and said second input operably connected to the output of said master IF amplifier means for sequentially receiving said amplified first and second frequency difference signals, and said phase detector output being operatively connected to said computer means for sequentially supplying said first and second measurement signals thereto for conversion to a highly accurate, unambiguous, digital distance measurement for display on said display panel means.

11. The digital distance measuring system of claim 10 wherein said remote transceiver means further includes a remote transceiver housing means for substantially enclosing said remote transceiver means, said remote transceiver housing means being adapted to be operatively carried at least one of within and on the outside of said flag marker means, said remote transceiver housing including an antenna means for transmitting and receiving radio signals.

12. The digital distance measuring system of claim 11 wherein said means for generating said remote carrier frequency signal includes a UHF oscillator means for generating a predetermined, fixed, remote carrier frequency signal.

13. The digital distance measuring system of claim 12 wherein said means responsive to said first and second master carrier frequency signals and to said generated fixed remote carrier frequency signal includes:
   remote mixer means for sequentially mixing said first and second master carrier frequency signals with said generated remote carrier frequency signal to produce first and second frequency difference signals, respectively; and
   remote IF amplifier means responsive to the output of said mixer means for sequentially outputting IF-amplified first and second frequency difference signal.

14. The digital distance measuring system of claim 13 wherein said means for dividing-down said remote carrier frequency signal includes at least one remote digital divide-by-"m" logic circuit.

15. The digital distance measuring system of claim 14 wherein said means for generating said first and second known phase reference signals includes a remote phase comparator means having two inputs and two outputs, one of said inputs being operatively coupled to the output of said at least one remote divide-by-"n" logic circuit means for supplying said divided-down signal thereto, and the other of said inputs being operatively coupled to the output of said remote IF amplifier means for receiving said amplified first and second frequency difference signals therefrom and for outputting said first and second known phase reference signals from one of said outputs.

16. The digital distance measuring system of claim 15 wherein said means for generating said first and second known phase reference signals further includes:
   a remote loop filter means having an input operatively coupled to said one output of said remote phase comparator means and an output for supplying said filtered first and second known phase reference signals, said loop filter means forming a phase lock loop including said remote UHF oscillator means, said remote divide-by-"m" logic circuit means, said remote phase comparator means, and a sense-switching means;
   an out-of-lock detector means having an input operatively connected to the second output of said remote phase comparator means, and an output for generating a sequence of sense-switching signals whenever said phase lock loop is out-of-lock;
   a sense-switching means having two inputs and an output, one of said inputs being operatively connected to the output of said remote loop filter means and the output of said phase sense-switching means being operably connected to said remote UHF oscillator means;
   said sense-switching means being adapted to periodically change the polarity of the remote loop filter output for as long as the phase lock loop remains out-of-lock, said means being responsive to a locked state and maintaining polarity of the signal provided to the UHF oscillator means.

17. A method of unambiguously and accurately measuring the distance between the lie of a golfer's ball on a golf course and the location of the particular hole toward which the golfer is advancing his golf ball comprising the steps of:
   providing a master transceiver system adapted to be positioned proximate the position of the golfer's ball;
   associating a remote transceiver system with a flag marker at said particular hole for uniquely identifying same;
   manually-initiating a request for a measurement of the distance between the golfer's ball and said particular hole;
   generating a master frequency reference signal;
   programming a frequency synthesizer to output a first master carrier frequency signal, using said master frequency reference signal;
   modulating said first master carrier frequency signal with a digital data signal and transmitting same to said remote transceiver system;
   comparing said digital data signal received by said remote transceiver system with a remotely stored digital data signal indicative of the particular hole's unique identification number;
   producing an enablement signal in response to a positive identification match;
   initiating the generation of a fixed remote carrier frequency signal in response to said enablement signal;
   transmitting said remote carrier frequency signal back to said master transceiver system for verifying that said particular hole has been positively identified as the one toward which said golfer is presently advancing his golf ball;
   continuing to transmit said first master carrier frequency signal from said master transceiver system to said remote transceiver system;
   dividing down the frequency of said remote carrier frequency signal to produce a divided-down remote frequency signal;
   mixing said first master carrier frequency signal and said remote carrier frequency signal to generate a first difference frequency signal;
   forming a phase lock loop;
   inputting said divided down remote carrier frequency signal and said first difference frequency signal to a phase comparator in said phase lock loop and locking said phase lock loop to output a first known phase reference signal indicative of the first distance measurement;
   transmitting said remote carrier frequency signal with said first known phase reference back to said master transceiver system;
   dividing down said master frequency reference signal to produce a divided-down master signal;
   mixing said remote carrier frequency signal having said first known phase reference and said first master carrier frequency signal to generate said first frequency difference signal;
   feeding said master divided-down signal and said first frequency difference signal to the input of a master phase detector for outputting said phase detector output signal indicative of a first distance measurement;

converting said first phase detector output signal into an ambiguous distance measurement value because the signal repeats itself every one-half wavelength;

reprogramming said frequency synthesizer to output a second different and distinct master carrier frequency signal for transmission to said remote transceiver system;

again remotely mixing said second master carrier frequency signal and said remote carrier frequency signal to produce a second frequency difference signal;

again feeding said second frequency difference signal and said divided-down remote signal to the inputs of said remote phase comparator means and outputting a second phase detector output signal indicative of the desired distance measurement;

again transmitting said remote carrier frequency signal with said second known phase references data back to said master transceiver system;

again mixing said second master carrier frequency signal and said remote carrier frequency signal having said second known phase reference to reproduce said second frequency difference signal;

inputting said second frequency difference signal and said divided-down master signal to produce a second phase detector output signal;

converting said first and second phase detector output signals into digital distance values, combining same to obtain an unambiguous, highly accurate, distance measurement value; and displaying said distance measurement value for informing the golfer of the measured distance between the present position of his golf ball and the hole currently being approached.

18. A method for accurately measuring the distance between a point "A" and a remote point "B" comprising the steps of:

positioning a master transceiver at point "A";

locating a remote transceiver at point "B";

generating a first master carrier frequency signal with said master transceiver and transmitting same to said remote transceiver;

generating a fixed remote carrier frequency signal at said remote transceiver;

determining a first frequency difference between said first master carrier frequency signal and said remote carrier frequency signal, where said first master carrier frequency signal is of a lower frequency than said remote carrier frequency signal;

phase-locking said signals to produce a first known phase reference;

transmitting said remote carrier frequency signal with said first known phase reference to said master transceiver;

comparing said first phase-locked remote carrier frequency signal with said first master carrier frequency signal;

regenerating said first known phase difference signal indicative of the measured distance to a particular point on a given waveform cycle;

generating a second master carrier frequency signal and transmitting same to said remote transceiver;

repeating said steps of determining, phase-locking and transmitting said remote carrier frequency signal having a second known phase reference to said master transceiver;

again comparing said phase-locked remote carrier frequency signal having said second known phase reference with said second master carrier frequency signal to generate a second phase difference signal indicative of the measured distance to a particular waveform cycle;

utilizing said generated first and second phase difference signals to compute a digital distance measurement; and displaying said digital distance measurement for use by the user of the system.

19. A digital distance measuring system for accurately measuring the distance between a point "A" and a remote point "B" comprising:

a master transceiver means locateable at point "A";

a remote transceiver means locateable at point "B";

said master transceiver means including master circuit means for generating a first master carrier frequency signal and transmitting same to said remote transceiver means;

said remote transceiver means including remote circuit means (1) responsive to said first master carrier frequency signal for generating a fixed remote carrier reference signal, (2) for determining the frequency difference between said first master carrier frequency signal and said fixed remote carrier frequency signal, (3) phase-locking said signals and (4) transmitting said phase-locked remote carrier frequency signal with a first known phase reference back to said master transceiver means;

said master circuit means further including means responsive to said first phase-locked remote carrier frequency signal for recreating said first known phase reference indicative of a distant measurement to a point on a given waveform cycle, and then generating a second master carrier frequency signal, and transmitting same back to said remote transceiver means;

said remote transceiver means again (1) determining the phase difference between said first master carrier frequency signal and said remote carrier frequency signal, (2) phase-locking said signals and (3) transmitting said phase-locked remote carrier frequency signal with a second known phase reference back to said master transceiver means;

said master circuit means then again generating a second known phase difference signal indicative of the distance measurement to a given waveform; and said master circuit means still further including means responsive to said first and second known phase reference signals for computing said measured distance unambiguously and accurately displaying same for distance measurement purposes.

20. A system for accurately measuring the distance between a point "A" and a remote point "B" comprising:

a master transceiver system operably positionable at point "A";

a remote transceiver system operatively positionable at remote point "B";

said master transceiver system including a frequency synthesizer means, a IF amplifier means, and a master circuit means for (1) generating a fixed master reference frequency signal; (2) first programming said frequency synthesizer means with a desired first master carrier frequency signal and then, a predetermined time later, with a second desired master carrier frequency signal; said frequency synthesizer means being responsive to said master reference carrier frequency signal and said programming for producing said first master carrier frequency signal and, at a predetermined time later, said second master carrier frequency signal; and (3) transmitting said first master carrier frequency signal and, at said predetermined time later, said second master carrier frequency signal to said remote transceiver system;

said remote transceiver system including remote circuit means for: (1) receiving said first and second master carrier frequency signals; (2) generating a fixed remote reference carrier frequency signal; (3) mixing said first and second master carrier frequency signals with said remote reference carrier frequency signal for producing first and second frequency difference signals; (4) IF amplifying said first and second frequency difference signals to produce first and second IF amplified difference frequency signals, respectively; (5) dividing down said fixed remote reference carrier frequency signal; (6) comparing the phase of said first and second IF amplified difference frequency signals and said divided down remote reference carrier frequency signal to generate first and second known phase references; (7) phase-locking said first and second master carrier frequency signals with said remote reference carrier frequency signal, respectively; and (8) first transmitting said remote carrier frequency signal with said first known phase reference back to said master transceiver means and then, said predetermined time later, transmitting said remote reference carrier frequency signal with said second known phase reference back to said master transceiver system;

said master circuit means of said master transceiver system further including master circuit means for (1) receiving said remote carrier frequency signals; (2) mixing said remote carrier frequency signal with said first and second master carrier frequency signals, respectively, for generating first and second frequency difference signals, respectively; (3) dividing down said fixed master reference frequency signal; (4) IF amplifying said first and second frequency difference signals, respectively; (5) comparing the phases of said divided down master reference frequency signal with said first and second frequency difference signals to output first and second phase reference distance measurement signals, respectively; and (6) adding said first and second phase reference signals to calculate a single, unambiguous, highly accurate measurement of the distance between point "A" and point "B".

21. The system of claim 20 wherein said frequency synthesizer means comprises means programmed to produce first and second master carrier frequency signals which are displaced a predetermined distance from said remote carrier frequency signal by an amount equal to the IF frequency for enabling a single, highly accurate, unambiguous distance measurement to be made between points "A" and "B".

22. A method of accurately measuring the distance between a point "A" and a remote point "B" comprising the steps of:

positioning a master transceiver system proximate point "A";

locating a remote transceiver system proximate point "B";

generating a master reference carrier frequency at said master transceiver system;

synthesizing a first master carrier frequency signal where said first master carrier frequency signal equals said master reference carrier frequency signal plus a first IF frequency signal;

transmitting said first master carrier frequency signal to said remote transceiver system;

producing a remote reference carrier signal where said first master carrier frequency signal is displaced above said remote reference carrier frequency signal;

mixing said first master carrier frequency signal and said remote reference carrier frequency signal to obtain a first frequency difference signal;

IF amplifying said first frequency difference signal;

dividing down said remote reference carrier frequency signal;

comparing the phases of said divided down remote carrier frequency signal and said IF amplified first frequency difference signal;

phase-locking said carrier frequency signals together such that the phase of the IF frequency equals the difference in phase between the first master carrier frequency signal and the remote reference carrier frequency signal and becomes a first known phase reference;

transmitting the remote carrier frequency signal with said first known phase reference back to said master transceiver system;

mixing said remote carrier frequency signal and said first master carrier frequency signal to produce a first difference signal equal to the IF frequency of the master transceiver station;

IF amplifying said first difference frequency signal;

dividing down said master reference carrier frequency signal;

comparing the phases of said divided-down master reference carrier frequency signal and the IF amplified first frequency difference signal to output a first distance measurement signal which is ambiguous because it repeats every one-half wavelength of said first master carrier frequency signal;

synthesizing a second master carrier frequency signal where said second master carrier frequency signal equals said master carrier reference signal minus said first IF frequency;

transmitting said second master carrier frequency signal to said remote transceiver system;

mixing said second master carrier frequency signal and said remote reference carrier frequency signal to obtain a second frequency difference signal;

IF amplifying said second frequency difference signal;

dividing down said remote reference carrier frequency signal;

comparing the phases of said divided down remote reference carrier frequency signal and said IF amplified second frequency difference signal;

phase-locking said carrier frequency signals together such that the phase of the IF frequency equals the difference in phase between the second master carrier frequency signal and the remote reference carrier frequency signal;

transmitting said remote carrier frequency signal with said second known phase reference back to said master transceiver system;

again mixing the remote carrier frequency signal with the second master carrier frequency signal to produce a second frequency difference signal equal to the IF frequency;

IF amplifying the second frequency difference signal;

dividing down the master reference carrier frequency signal;

comparing the phases of said divided-down master reference frequency signal and said IF amplified second frequency difference signal to output a second distance measurement signal which is unambiguous over a predetermined range; and combining said first and second distance measurement signals to compute the actual, unambiguous, and accurately measured distance between point "A" and point "B".

* * * * *